United States Patent
Yoshida

(10) Patent No.: US 9,930,215 B2
(45) Date of Patent: Mar. 27, 2018

(54) IMAGE FORMING CONTROL APPARATUS, METHOD OF GENERATING CORRECTION DATA, AND STORAGE MEDIUM

(71) Applicant: Makoto Yoshida, Kanagawa (JP)

(72) Inventor: Makoto Yoshida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/270,221

(22) Filed: Sep. 20, 2016

(65) Prior Publication Data

US 2017/0094116 A1    Mar. 30, 2017

(30) Foreign Application Priority Data

Sep. 30, 2015  (JP) ................. 2015-195167

(51) Int. Cl.
*H04N 1/407* (2006.01)
*G06K 15/02* (2006.01)
*H04N 1/405* (2006.01)

(52) U.S. Cl.
CPC ....... *H04N 1/4078* (2013.01); *G06K 15/1835* (2013.01); *G06K 15/1881* (2013.01); *H04N 1/405* (2013.01)

(58) Field of Classification Search
None
See application file for complete search history.

(56) References Cited

U.S. PATENT DOCUMENTS

| 5,585,927 | A | * | 12/1996 | Fukui | .............. H04N 1/407 358/300 |
|---|---|---|---|---|---|
| 7,499,197 | B2 | * | 3/2009 | Seki | .............. H04N 1/407 358/1.9 |
| 2011/0292417 | A1 | * | 12/2011 | Miyagi | .............. H04N 1/6033 358/1.9 |
| 2016/0248934 | A1 | * | 8/2016 | Sugimoto | .............. H04N 1/6027 |

FOREIGN PATENT DOCUMENTS

| JP | 2000-184217 | 6/2000 |
|---|---|---|
| JP | 2009-141941 | 6/2009 |

* cited by examiner

*Primary Examiner* — Thomas D Lee
(74) *Attorney, Agent, or Firm* — Oblon, McClelland, Maier & Neustadt, L.L.P.

(57) ABSTRACT

An image forming control apparatus for controlling an image forming apparatus to form an image on a recording medium includes a memory to store a target property data of original gradation values of image data of a target image to be formed on the recording medium; and circuitry to acquire actual property data of the target image actually formed on the recording medium, convert the original gradation values to another gradation values, generate a primary correction data based on the original gradation values and the another gradation values, generate a secondary correction data to supplement the generated primary correction data, compare the primary correction data and the secondary correction data, and generate gradation correction data used for correcting the original gradation values existing in a specific range of the original gradation values based on a comparison result of the primary correction data and the secondary correction data.

9 Claims, 16 Drawing Sheets

IMAGE FORMING CONTROL APPARATUS, METHOD OF GENERATING CORRECTION DATA, AND STORAGE MEDIUM

CROSS-REFERENCE TO RELATED APPLICATION

This application claims priority pursuant to 35 U.S.C. § 119(a) to Japanese Patent Application No. 2015-195167, filed on Sep. 30, 2015 in the Japan Patent Office, the disclosure of which are incorporated by reference herein in their entirety.

BACKGROUND

Technical Field

This disclosure relates to an image forming control apparatus, an image forming system, a method of generating correction data, and a storage medium.

Background Art

When image data is input to image forming apparatuses, the image forming apparatuses form images on recording media while stabilizing image quality even if properties of the image forming apparatuses fluctuate due to environmental factors and aging of the image forming apparatuses by applying a calibration method. When the calibration is performed, an image forming apparatus forms a gradation test pattern on a recording medium, an image scanner such as a colorimeter scans a density of the gradation test pattern formed on the recording medium, and the scanning result is fed back to be reflected on an image forming condition such as gradation correction of image data known as a gamma correction.

SUMMARY

As one aspect of the present invention, an image forming control apparatus for controlling an image forming apparatus to form an image on a recording medium is devised. The image forming control apparatus includes a memory to store a target property data set for each of original gradation values of image data of a target image to be formed on the recording medium, and circuitry. The circuitry acquires actual property data of the target image actually formed on the recording medium, the actual property data being measured by using an measurement apparatus, converts the original gradation values of the image data of the target image to another gradation values by referring a relationship of the target property data stored in the memory and the measured actual property data of the target image, generates a primary correction data based on the relationship of the original gradation values and the another gradation values converted from the original gradation values, generates a secondary correction data to supplement the generated primary correction data while maintaining a maximum gradation value of the image data of the target image when correcting the original gradation values of the image data of the target image, compares the generated primary correction data and the generated secondary correction data at each one of the original gradation values existing in a specific range set from a specific gradation value to the maximum gradation value of the original gradation values of the image data of the target image, and generates gradation correction data used for correcting each one of the original gradation values existing in the specific range based on a comparison result of the generated primary correction data and the generated secondary correction data.

As another aspect of the present invention, a method of generating correction data used for correcting image data of a target image, the corrected image data is to be used by an image forming apparatus to form an image on a recording medium, is devised. The method includes storing, in a memory, a target property data set for each of original gradation values of image data of a target image to be formed on the recording medium, acquiring the target property data from the memory and actual property data of the target image actually formed on the recording medium by using the image forming apparatus and measured by using an measurement apparatus, converting the original gradation values of the image data of the target image to another gradation values by referring a relationship of the target property data and the measured actual property data of the target image, generating a primary correction data based on the relationship of the original gradation values and the another gradation values converted from the original gradation values, generating a secondary correction data to supplement the generated primary correction data while maintaining a maximum gradation value of the image data of the target image when correcting the original gradation values of the image data of the target image, comparing the generated primary correction data and the generated secondary correction data at each one of the original gradation values existing in a specific range set from a specific gradation value to the maximum gradation value of the original gradation values of the image data of the target image, and generating gradation correction data used for correcting each one of the original gradation values existing in the specific range based on a comparison result of the generated primary correction data and the generated secondary correction data.

As another aspect of the present invention, a non-transitory storage medium storing a program that, when executed by a computer, causes the computer to execute a method of generating correction data used for correcting image data of a target image, the corrected image data is to be used by an image forming apparatus to form an image on a recording medium, is devised. The method includes storing, in a memory, a target property data set for each of original gradation values of image data of a target image to be formed on the recording medium, acquiring the target property data from the memory and actual property data of the target image actually formed on the recording medium by using the image forming apparatus and measured by using an measurement apparatus, converting the original gradation values of the image data of the target image to another gradation values by referring a relationship of the target property data and the measured actual property data of the target image, generating a primary correction data based on the relationship of the original gradation values and the another gradation values converted from the original gradation values, generating a secondary correction data to supplement the generated primary correction data while maintaining a maximum gradation value of the image data of the target image when correcting the original gradation values of the image data of the target image, comparing the generated primary correction data and the generated secondary correction data at each one of the original gradation values existing in a specific range set from a specific gradation value to the maximum gradation value of the original gradation values of the image data of the target image, and generating gradation correction data used for correcting each one of the original gradation values existing in the specific range based on a comparison result of the generated primary correction data and the generated secondary correction data.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
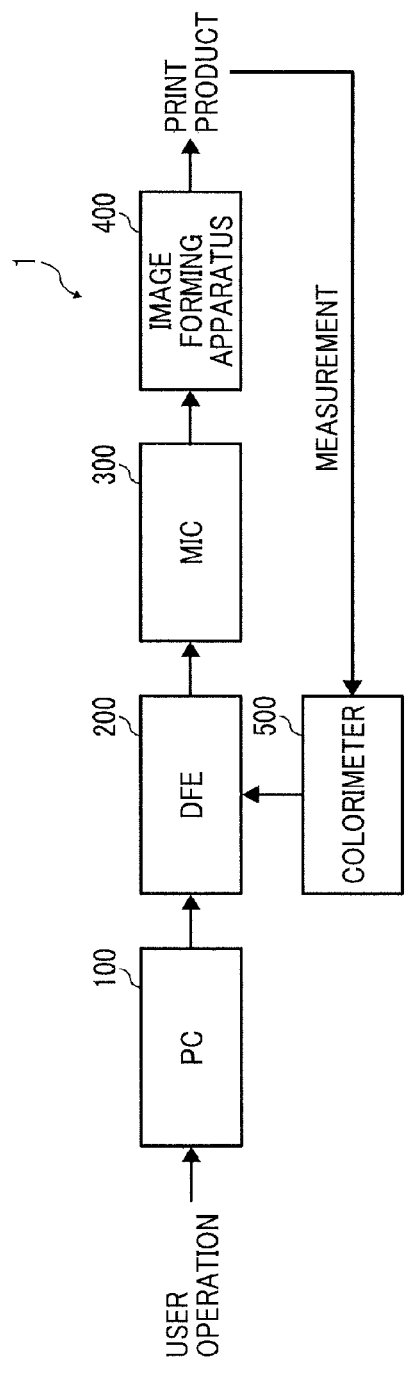
FIG. 1 illustrates a schematic diagram of an image forming system 1 of a first example embodiment of the present invention.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, one or more apparatuses or systems according to one or more example embodiments of the present invention are described hereinafter.

First Example Embodiment

A description is given of an image forming system 1 of a first example embodiment of the present invention with reference to FIGS. 1 to 15. FIG. 1 illustrates a schematic diagram of the image forming system 1 of the first example embodiment. The image forming system 1 includes, for example, a personal computer (PC) 100, which is an example of an information processing apparatus, a digital front end (DFE) 200, which is an example of an image forming control apparatus such as a printer controller, a mechanism interface (I/F) controller (MIC) 300, which is an example of interface controller, and an image forming apparatus 400. Further, a colorimeter 500 can be connected to the DFE 200. Since the colorimeter 500 is not used for a normal image forming operation, the colorimeter 500 can be disposed as a part of the image forming system 1, or the colorimeter 500 can be disposed as an external apparatus of the image forming system 1.

Based on a user operation, the PC 100 instructs the image forming apparatus 400 and the DFE 200 to perform various processing. The PC 100 can instruct the image forming apparatus 400 to perform the printing, and the DFE 200 to generate correction data.

The DFE 200 can be used as the image forming control apparatus that controls the image forming apparatus 400. Based on the instruction from the PC 100, the DFE 200 generates image data and setting information to be used by the image forming apparatus 400 to perform the printing, and transmits the image data and setting information to the image forming apparatus 400 via the MIC 300. Further, based on the instruction from the PC 100, the DFE 200 generates gradation correction data, which is correction data used for correcting gradation values of image data. The detail of the DFE 200 will be described later with reference to FIGS. 4 to 6. The MIC 300 can be used as a communication interface between the DFE 200 and the image forming apparatus 400. The image data may mean any kinds of image data such as document data including text, characters, figures, picture image or the like, but not limited hereto.

Based on the image data received from the DFE 200 via the MIC 300, the image forming apparatus 400 forms an image on a recording medium such as a sheet. The image forming apparatus 400 can employ the electrophography using four colors of toner such as C (cyan), M (magenta), Y (yellow), K (black), but not limited hereto. The image forming apparatus 400 can employ the inkjet method or others, and the number of colors is not limited four, but the number of colors can be one such as monochrome.

The colorimeter 500 scans a target image to measure color and density included in the target image, and outputs the measurement result to an external apparatus. For example, the colorimeter 500 measures a gradation patch image having a plurality of gradation patches having different gradation values printed by the image forming apparatus 400, in which the colorimeter 500 measures the density of each of the gradation patches corresponded to each of gradation values, and transmits the measurement result to the DFE 200, in which the colorimeter 500 can be used as a density measurement apparatus. The colorimeter 500 may be connected to the DFE 200 only when the correction data is to be generated.

Figure 2:
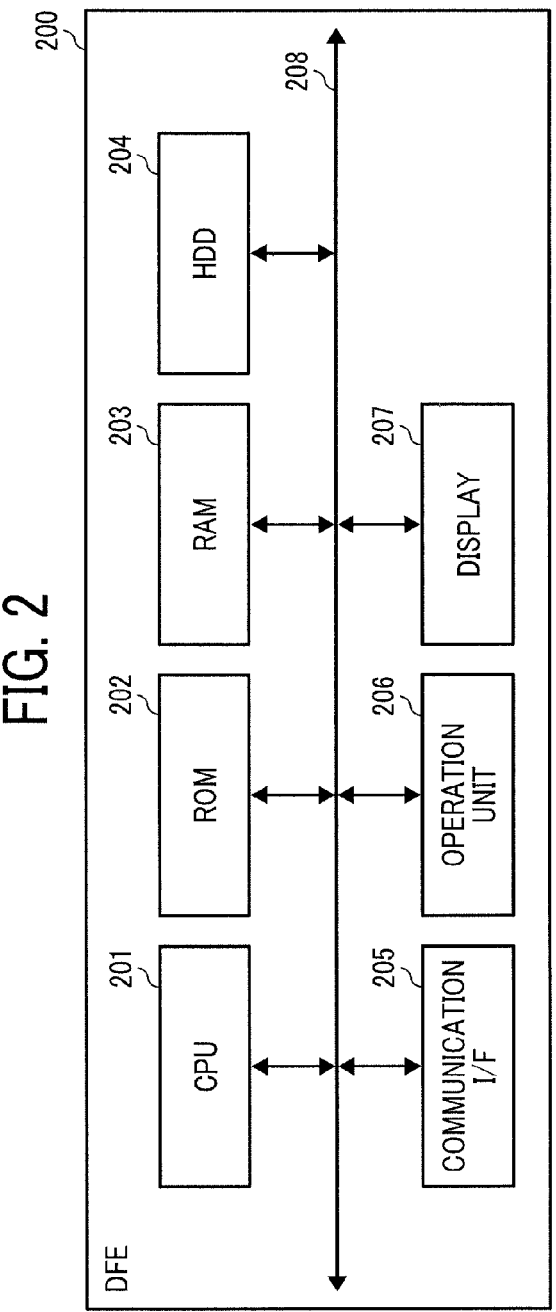
FIG. 2 illustrates an example diagram of a hardware configuration of a DFE of FIG. 1.

FIG. 2 illustrates an example diagram of a hardware configuration of the DFE 200 of FIG. 1. As illustrated in FIG. 2, the DFE 200 includes, for example, a central processing unit (CPU) 201, a read only memory (ROM) 202, a random access memory (RAM) 203, a hard disk drive (HDD) 204, a communication interface (I/F) 205, an operation unit 206, and a display 207 connectable by a system bus 208.

When the CPU 201 executes programs stored in the ROM 202 or the HDD 204 by using the RAM 203 as a working area to control the DFE 200 entirely, and implements various capabilities such as capabilities to be described later with reference to FIGS. 4 to 6. The ROM 202 and the HDD 204 are examples of a non-volatile memory or storage medium that stores various programs executable by the CPU 201 and various data. The communication I/F 205 can be used as an interface to communicate with an external apparatus such as the PC 100, the MIC 300 and the colorimeter 500. The communication protocol can be any protocols such as network protocol, dedicated line, and peer to peer wireless communication. The communication protocol can be set differently depending on communication partners.

The operation unit 206 is used as an operation receiver that receives a user operation. The operation unit 206 includes, for example, various buttons and switches, and a touch panel. The operation unit 206 can be used to receive an operation to a graphical user interface (GUI) displayed on the display 207. The display 207 is used as a display unit that displays the GUI, operation status and settings of the DFE 200, and messages to a user. The display 207 employs, for example, a liquid crystal display and a light emitter. The DFE 200 can omit the operation unit 206 and the display 207 if the DFE 200 is not operated by a user, in which the DFE 200 can receive an operation from the external apparatus such as the PC 100 connected via the communication I/F 205, and the DFE 200 can display information. The hardware configuration of the PC 100 can be configured same as the hardware configuration of the DFE 200 indicated in FIG. 2, in which specific capabilities can be changed as required.

Figure 3:
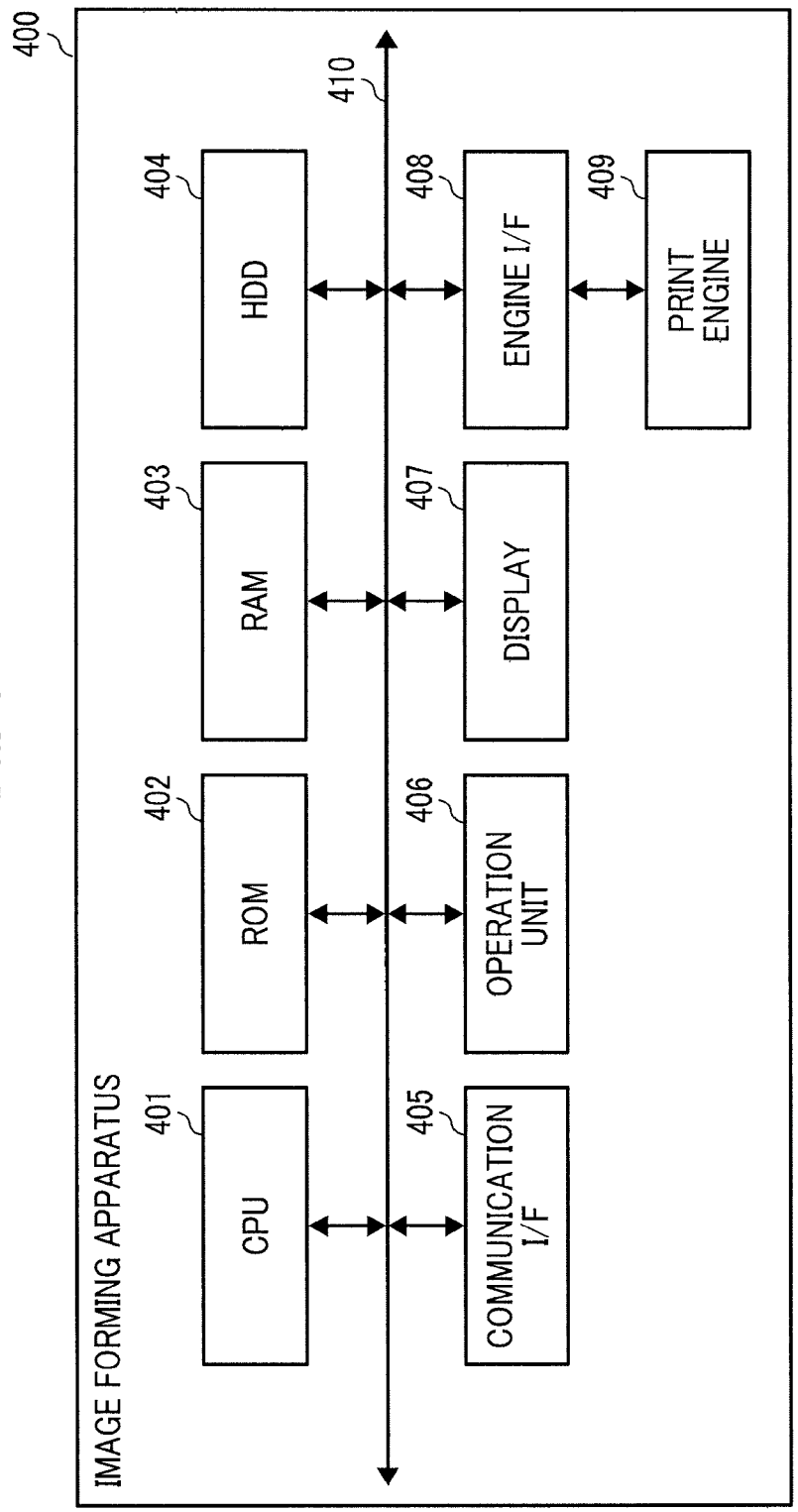
FIG. 3 illustrates an example diagram of a hardware configuration of an image forming apparatus 400 of FIG. 1.

FIG. 3 illustrates an example diagram of a hardware configuration of the image forming apparatus 400 of FIG. 1. As illustrated in FIG. 3, the image forming apparatus 400 includes, for example, a CPU 401, a ROM 402, a RAM 403, a HDD 404, a communication interface (I/F) 405, an operation unit 406, a display 407, and an engine interface (I/F) 408 connectable by a system bus 410. The image forming apparatus 400 further includes, a print engine 409 connected to the engine I/F 408.

The CPU 401 to the display 407 are same as the CPU 201 to the display 207 of FIG. 2, in which specific configuration can be changed as required. The engine I/F 408 used as an interface to connect the print engine 409 and the system bus 410, with which the CPU 401 can control the print engine 409. The print engine 409 can be used as an image forming device that forms an image on a recording medium such as a sheet based on image data.

Figure 4:
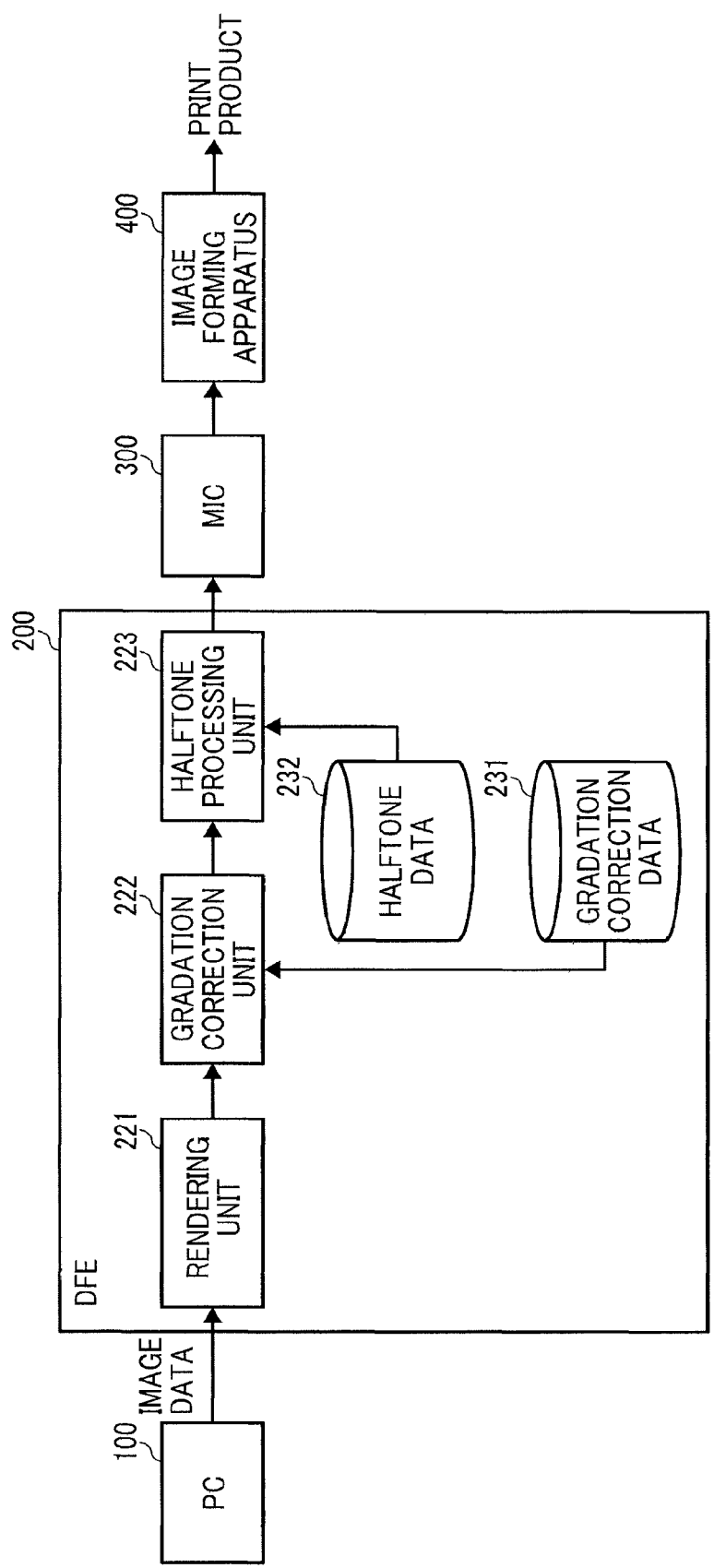
FIG. 4 illustrates a functional diagram of the DFE of FIG. 1 that instructs the image forming apparatus to perform a printing.

FIG. 4 illustrates a functional diagram of the DFE 200 of FIG. 1 that instructs the image forming apparatus 400 to perform a printing operation such as document image printing. As illustrated in FIG. 4, the DFE 200 includes, for example, a rendering unit 221, a gradation correction unit 222 and a halftone processing unit 223. When the image forming apparatus 400 is to perform the printing operation based on the instruction from the PC 100, the PC 100 transmits a print command, print settings used for the printing operation (e.g., condensing, magnification, duplex), and to-be-printed image data (e.g., document image data) to the DFE 200. The rendering unit 221 performs the rendering process based on the image data and the print settings, and generates image data to be formed as a printed image by using the image forming apparatus 400.

The gradation correction unit 222 performs a gradation correction process to the image data generated by the rendering unit 221 based on gradation correction data 231. The gradation correction is performed in view of the fluctuation of image density of an image formed for the same gradation value by the image forming apparatus 400, in which the fluctuation of image density may be caused by environmental factors of the image forming apparatus 400 and aging of the image forming apparatus 400 over time. The gradation correction is performed to adjust the gradation values of the image data from the original gradation values to another gradation values so that the image forming apparatus 400 that receives the image data having another gradation values can print an image having a target density set for the original gradation values of each of pixels included in the image data of a process target (e.g., original document image).

The gradation correction data 231 includes data how to convert the original gradation values of each of pixels of the image data input as the process target (i.e., input gradation values) to another gradation values (i.e., output gradation values) converted for each of the input gradation values. For example, a relationship of the input gradation values and the output gradation values can be set as indicated by a profile of FIG. 9, but not limited hereto. Further, the gradation correction data 231 can be generated and updated by using the capabilities indicated in FIG. 6. The input gradation value can be also referred to as the pre-conversion gradation value or the pre-correction gradation value, and the output gradation value can be also referred to as the post-conversion gradation value or the post-correction gradation value.

After the gradation values of the image data are corrected by the gradation correction unit 222, the halftone processing unit 223 performs a halftone process to the image data to generate the image data of a halftone image so that the gradation values of each one of the pixels can be expressed by halftone dots. The relationship pf the gradation values of each one of the pixels and the corresponding halftone images can be stored or registered as halftone data 232 in the memory in advance. Further, the halftone data 232 can be prepared for a plurality of sets, with which data of one set can be selected from the plurality of the sets depending on the print settings. Further, the halftone data 232 defines that a pixel having a maximum gradation value is converted to a solid image.

The DFE 200 transmits the image data processed by the halftone processing unit 223, and the print settings to be used for a printing operation at the image forming apparatus 400 such as duplex printing to the image forming apparatus 400 via the MIC 300. The image forming apparatus 400 forms an image on a recording medium based on the image data and the print settings.

The image forming system 1 having the above described configuration and capabilities can generate the gradation correction data 231 as follows. A description is given of generation of the gradation correction data in detail with reference to drawings. FIGS. 5 and 6 illustrate functional diagrams of the DFE 200 of FIG. 1 for generating the gradation correction data 231. FIG. 5 illustrates a functional diagrams of the image forming system 1 used for printing a gradation patch sheet.

Figure 5:
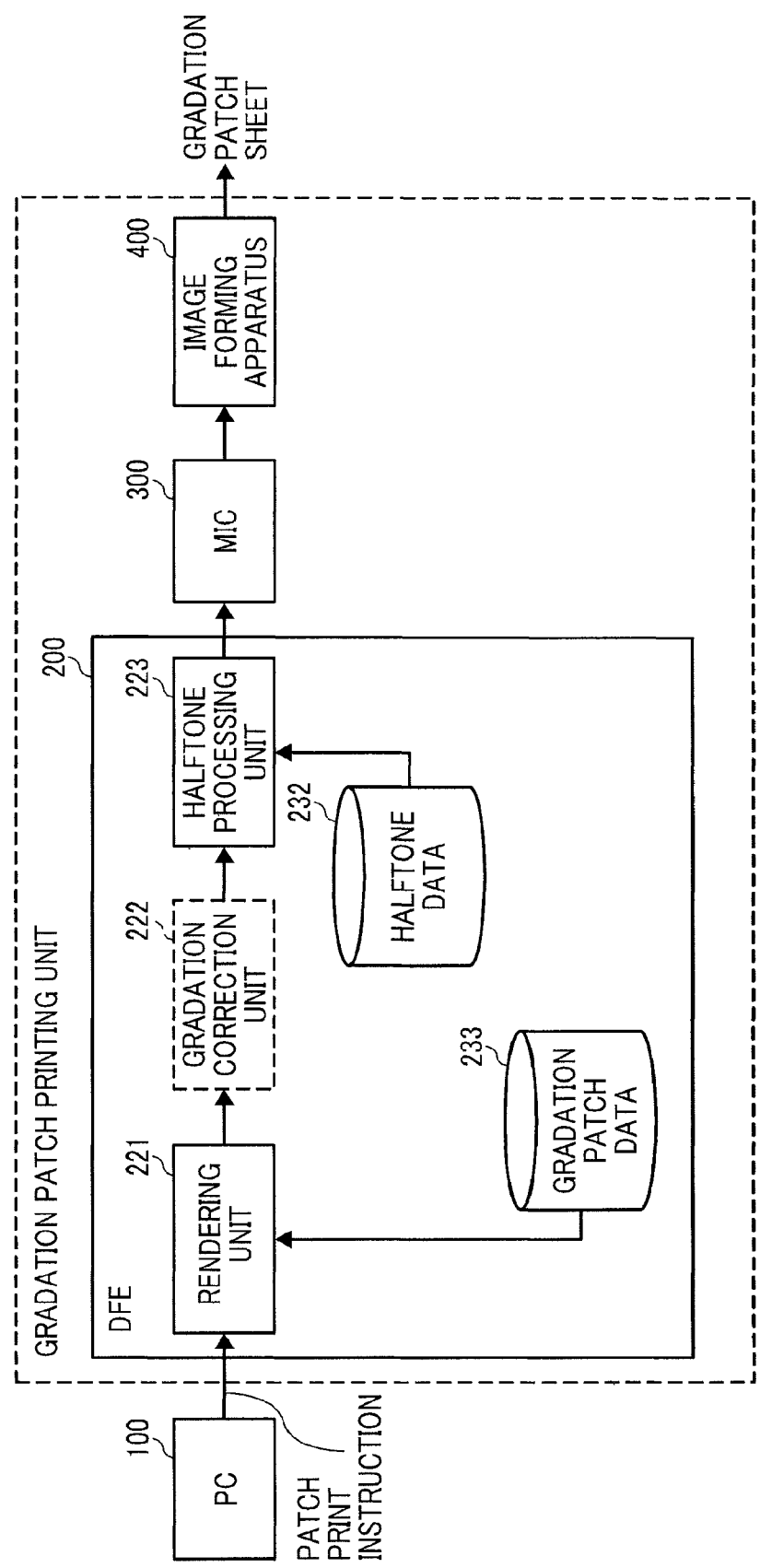
FIG. 5 illustrates a functional diagrams of the image forming system used for printing a gradation patch sheet.
Figure 6:
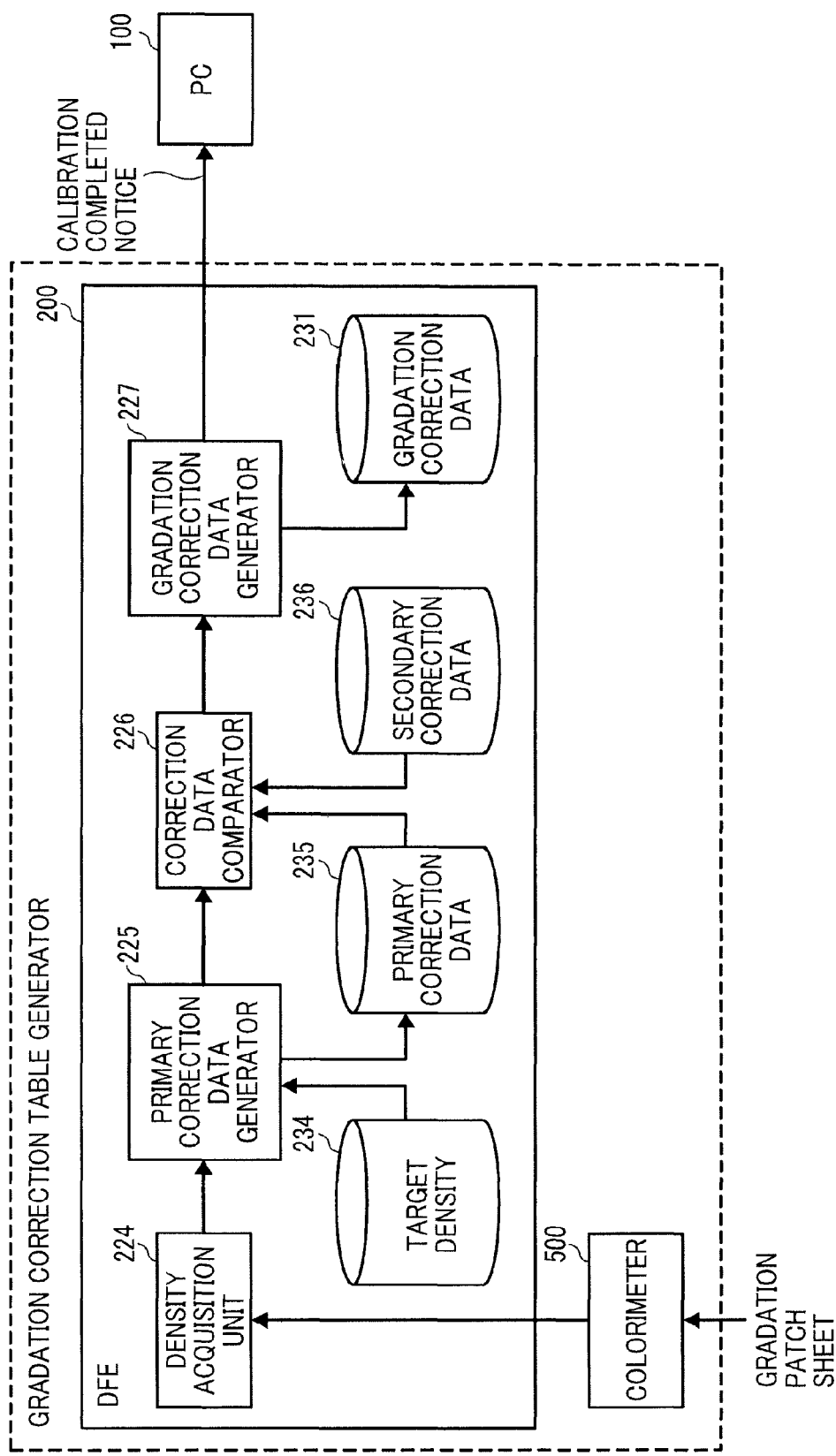
FIG. 6 illustrates a functional diagram of a gradation correction table generator that generates gradation correction data based on a gradation patch sheet

The functional diagram of FIG. 5 is almost same as the functional diagram of FIG. 4. The PC 100 transmits a patch print instruction to the DFE 200 to cause the DFE 200 to generate the gradation correction data 231. The PC 100 can transmit the patch print instruction to the DFE 200 each time a given number of image data is printed, the PC 100 can automatically transmit the patch print instruction to the DFE 200 each time a given time period elapses, or the PC 100 can transmit the patch print instruction to the DFE 200 based on a user instruction.

When the DFE 200 receives the patch print instruction, the rendering unit 221 generates image data to be used for printing a gradation patch sheet by using the image forming apparatus 400 based on the gradation patch data 233 generated in advance. The gradation patch data 233 can be, for example, data of the gradation patch sheet or the image data that the rendering unit 221 generates.

Similar to the printing operation of FIG. 4, the DFE 200 processes the image data generated by the rendering unit 221, and transmits the image data to the image forming apparatus 400 to perform the printing of the gradation patch sheet. When the gradation patch sheet is printed as indicated in FIG. 5, the gradation correction unit 222 does not perform the gradation correction process because the printed gradation patch sheet is used to detect a deviation level between a target image density (i.e., target property data) and an actually measured image density (i.e., measured property data or actual property data) of the image that is formed by using the gradation values that do not receive the gradation correction process.

Figure 7:
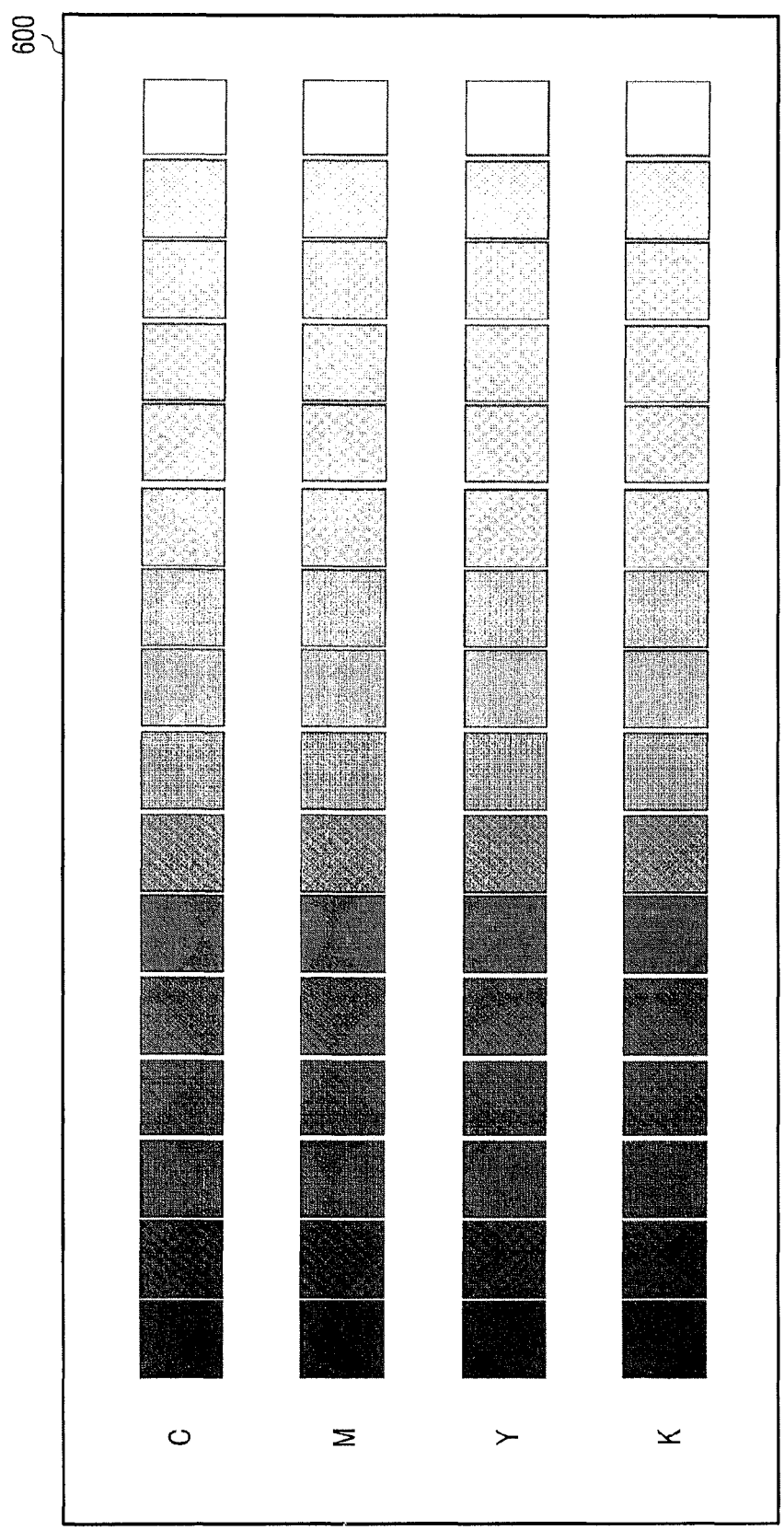
FIG. 7 illustrates an example of a gradation patch sheet.

FIG. 7 illustrates an example of a gradation patch sheet 600 printed by using the image forming apparatus 400. The gradation patch sheet 600 can be generated by forming gradation patches by correlating CMYK colors used for the image forming operation by the image forming apparatus 400 and various gradation values set in advance. As to an example case of FIG. 7, the gradation patches such as square marks corresponding to various gradation values are formed on a sheet for each one of CMYK colors, in which the gradation values become greater from right to left in FIG. 7. The gradation patch sheet 600 can be a white sheet but not limited hereto. For example, the gradation patch sheet 600 can be a transparent sheet, a colored sheet or the like.

For example, the gradation correction data 231 can be generated and stored for various types of sheets. If the gradation correction data 231 is generated and stored for various types of sheets, the gradation correction data matched to the type of to-be-used sheet can be used for the gradation correction when an image is to be printed. In this case, the gradation patch sheet 600 is printed by using one type of the sheet matched to the gradation correction data to be generated. Further, the gradation correction data 231 can be generated and stored for various types of the halftone data 232. If the gradation correction data 231 is generated and stored for various types of the halftone data 232, the gradation correction data 231 matched to the type of to-be-used halftone data 232 can be used for the gradation correction when an image is to be printed. In this case, when the gradation patch sheet 600 is to be printed, the halftone processing unit 223 performs the halftone process by using one type of the halftone data 232 matched to the gradation correction data 231 to be generated FIG. 6 illustrates a functional diagram of a gradation correction table generator that generates the gradation correction table such as the gradation correction data 231 based on the gradation patch sheet 600. As illustrated in FIG. 6, the DFE 200 includes, for example, a density acquisition unit 224, a primary correction data generator 225, a correction data comparator 226, and a gradation correction data generator 227. The density acquisition unit 224 acquires the color and density data of each one of the gradation patches printed on the gradation patch sheet 600 from the colorimeter 500. Based on the color and density data of each one of the gradation patches measured by the colorimeter 500, the density acquisition unit 224 acquires the image density corresponding to the gradation values of each of colors. For example, the density acquisition unit 224 can acquire an average image density of each one of the gradation patches corresponding to the gradation values of each of colors.

The gradation patch sheet 600 can be set in the colorimeter 500 automatically or by a user, and then the measurement of the gradation patch sheet 600 is performed by the colorimeter 500. Further, if the gradation patch sheet 600 is generated for a plurality of sheets and a plurality of halftone data, the density acquisition unit 224 acquires data indicating which condition corresponds to the currently scanned gradation patch sheet 600 by a user input operation or by scanning information printed on the gradation patch sheet 600.

Further, in addition to the plurality of sheets and the plurality of halftone data, the gradation correction data 231 can be generated for a plurality of colors. For the simplicity of description, a description is given of generating the gradation correction data 231 based on one condition such as color. The gradation correction data 231 corresponding to concerned colors and conditions can be generated based on image density and a target density 234 corresponding to the concerned colors and conditions. Further, the one gradation correction data 231 can be used for a plurality of conditions.

The primary correction data generator 225 generates primary correction data 235 as preliminary correction data by checking the target density 234 set for each of gradation values of an image in advance, and the measured density at each of the corresponding gradation values acquired by the density acquisition unit 224. The primary correction data generator 225 can be used as a primary correction data generator, and the primary correction data 235 can be generated as the primary correction data.

The target density 234 defines a desired image density of an image formed on a sheet by using the image forming apparatus 400. For example, the target density 234 defines a desired image density set for a gradation value of each of pixels to be formed as a gradation patch on the gradation patch sheet 600 by using the image forming apparatus 400. The target density 234 is a target value or an ideal value of image density set for each of the gradation values. The target density 234 can be set by a manufacture of the image forming apparatus 400, or can be set by a user that edits the density. Further, same data can be used for a plurality of conditions.

Figure 8:
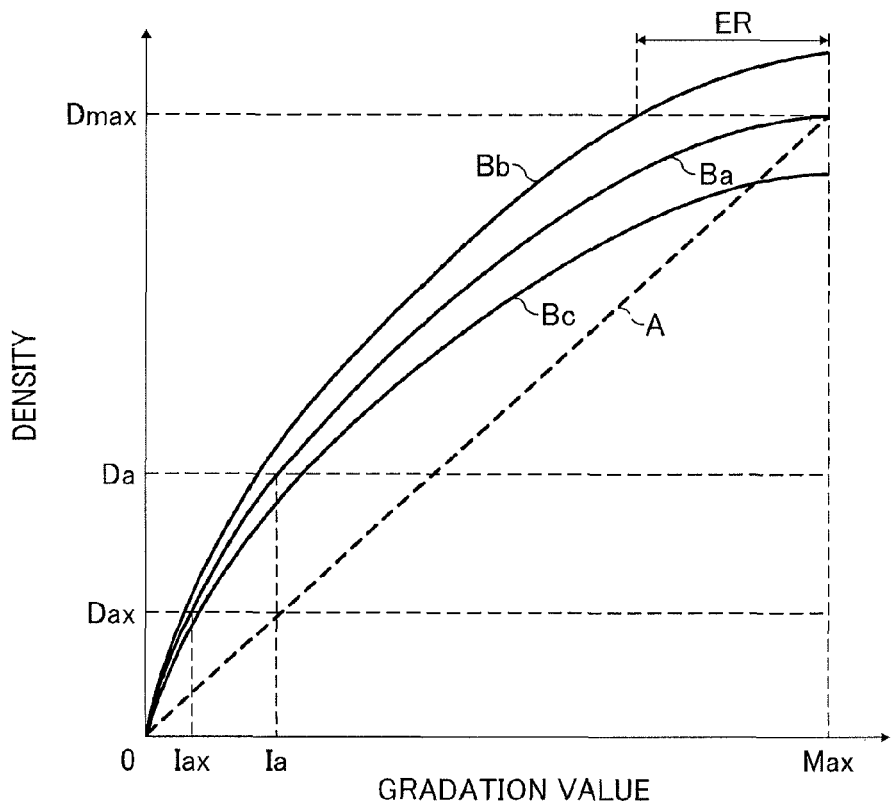
FIG. 8 illustrates an example of a relationship of density corresponding to each of gradation values acquired by a density acquisition unit and a target density.
Figure 9:
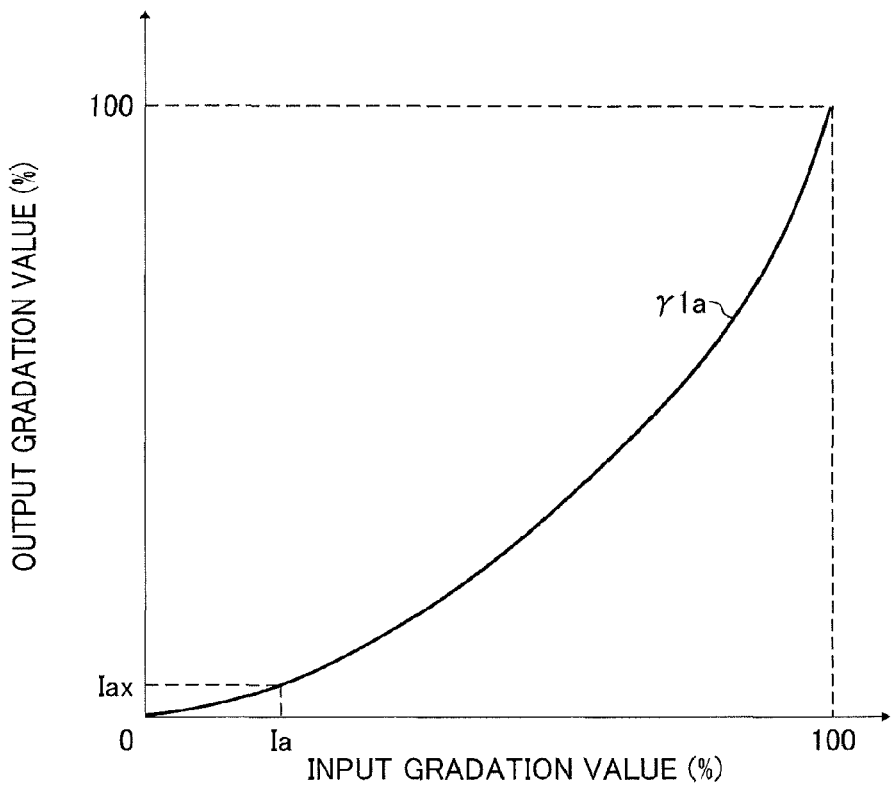
FIG. 9 illustrates an example of primary gradation correction data generated from a measured density indicated by a profile Ba in FIG. 8 and a target density indicated by a profile A in FIG. 8.
Figure 10:
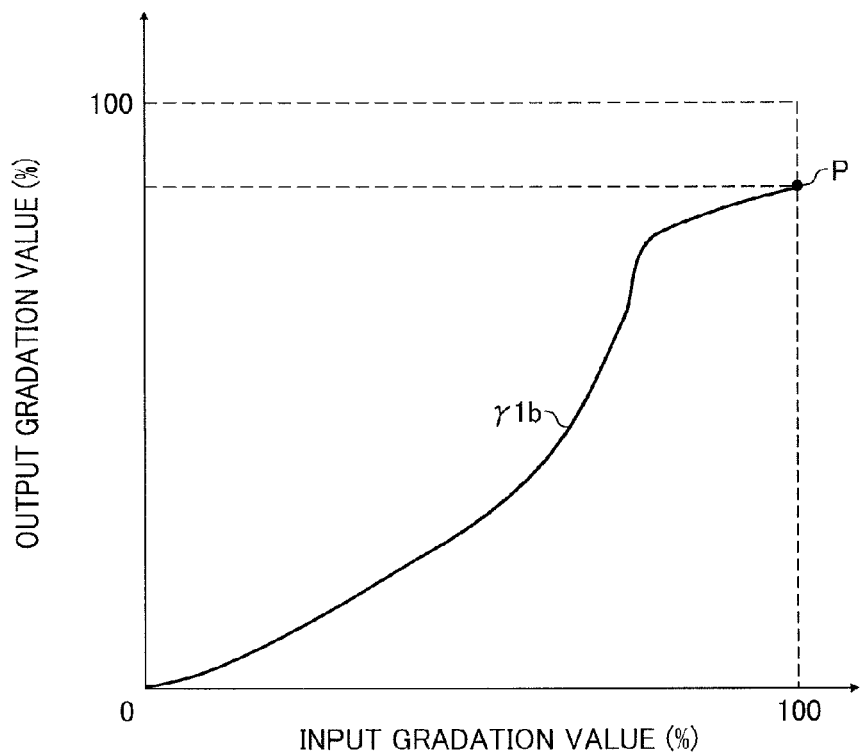
FIG. 10 illustrates another example of primary gradation correction data generated from a measured density indicated by a profile Bb in FIG. 8 and a target density indicated by a profile A in FIG. 8.

A description is given of the primary correction data 235 with reference to FIGS. 8 to 10. FIG. 8 illustrates an example of a relationship of density measured at each of the gradation values acquired by the density acquisition unit 224 and the target density 234. In FIG. 8, the horizontal axis represents the gradation value, and the vertical axis represents the density corresponding to the gradation values. The values of the density acquired by the density acquisition unit 224 and the values of the target density 234 can be prepared as discrete density values based on the corresponding discrete gradation values, which means the density acquired by the density acquisition unit 224 and the target density 234 can be expressed by discrete values, and thereby other density values between the discrete density values can be obtained by performing the interpolation. In FIG. 8, for the understanding the property, the density values are expressed by a line.

In FIG. 8, a profile A (i.e., dot line) indicates the target density 234. As to the target density 234, typically, the greater the gradation value, the higher the image density, but not limited hereto. In an example case of FIG. 8, the gradation values and the target density 234 have a substantially linear relationship, but not limited hereto. In an example case of FIG. 8, profiles Ba to Bc (i.e., solid lines) respectively indicate examples of density acquired by the density acquisition unit 224. As indicated by the profiles Ba to Bc, the actual image density of the image formed by the image forming apparatus 400 based on the original gradation values deviates from the target density 234 due to various factors such as machine-to-machine difference of the image forming apparatus 400, environmental factors of the image forming apparatus 400, and aging of the image forming apparatus 400 over time, and the deviation level from the target density 234 becomes various levels. In an example case of FIG. 8, the profiles Ba to Bc are mostly above the profile A, but the profiles Ba to Bc can be below the profile A.

A description is given of generating the primary correction data 235 based on the measured density indicated by the profile Ba and the target density 234 indicated in FIG. 8. In this example case, when the gradation value is Ia, the target density 234 is Dax as indicated in FIG. 8, but the image density of the image formed actually for the gradation value Ia becomes Da as indicated by the profile Ba of FIG. 8.

Then, the primary correction data 235 is generated to correct the gradation value. For example, when concerned one pixel of image data has the gradation value Ia, the primary correction data 235 is generated so that an image having the image density Dax (i.e., target density) can be formed for the concerned one pixel by correcting the gradation value Ia.

By referring the measured density, it can be estimated that the image having the image density Dax can be formed if the gradation value Ia is changed or converted to a gradation value Iax as indicated by the profile Ba. Therefore, data to convert the gradation value Ia to the gradation value Iax becomes the primary correction data 235 set for the gradation value Ia. Therefore, the primary correction data generator 225 can be generated by determining a relationship of each of pre-conversion gradation values (e.g., Ia) and the corresponding post-conversion gradation values (e.g., Iax). The format of the primary correction data 235 can be set same as the format of the gradation correction data 231.

FIG. 9 illustrates an example of the primary correction data 235 generated from the measured density indicated by the profile Ba and the target density 234 indicated by the profile A in FIG. 8. In FIG. 9, the horizontal axis represents pre-correction gradation values (i.e., input gradation values), and the vertical axis represents post-correction gradation values (i.e., output gradation values) corresponded to each of the input gradation values. The gradation values of the horizontal axis and gradation values of the vertical axis are expressed as relative values with respect to the maximum gradation value set as 100%. In FIG. 9, a profile γ1a (i.e. solid line) indicates a relationship of the input gradation values and the output gradation values defined by the primary correction data 235. For example, the primary correction data 235 can be generated as a data table correlating and storing each of the input gradation values and the corresponding each of the output gradation values. Further, the primary correction data 235 can be generated as a formula of an approximate curve such as the profile γ1a.

The primary correction data 235 of FIG. 9 is generated from the measured density indicated by the profile Ba and the target density indicated by the profile A of FIG. 8, in which the measured density and the target density becomes the same value at the maximum gradation value as indicated in FIG. 8, and thereby the maximum value of the input gradation values and the maximum value of the output gradation values becomes the same value. Therefore, even if the primary correction data 235 is used as the gradation correction data 231, the maximum gradation value of the output gradation values can be same as the maximum gradation value of input gradation values set for the image data of the original image even if the gradation correction unit 222 performs the gradation correction. Therefore, a void-included image does not occur at a concerned pixel having the maximum gradation value even when the halftone process is performed, and the concerned pixel can having the maximum gradation value be formed as a solid image. However, the profile Bb of FIG. 8 indicates another case that the measured density becomes greater than the target density 234 at the maximum gradation value, in which the void-included image may occur.

FIG. 10 illustrates another example of the primary correction data 235 generated from the measured density indicated by the profile Bb and the target density 234 indicated by the profile A in FIG. 8. When the measured density exceeds the target density Dmax (see FIG. 8) in a range ER (i.e., from one gradation value to the maximum gradation value) as indicated by the profile Bb in FIG. 8, and an image is to be formed with the target density 234 under this condition, the gradation values existing in the range ER are required to be converted to gradation values smaller than the maximum gradation value. Therefore, as indicated by a profile γ1b (i.e., solid line) of FIG. 10, the maximum value of the input gradation values is not corresponded to the maximum value of the output gradation values, but the maximum value of the input gradation values is corresponded to a value of the output gradation values that is smaller than the maximum value of the output gradation values, which is indicated by a point P on the profile γ1b of FIG. 10. Therefore, when the primary correction data 235 of FIG. 10 is used as the gradation correction data 231, the maximum gradation value set for the image data of the original image is corrected to the value smaller than the maximum gradation value, with which a void-included image occurs at the concerned pixels when the halftone process that forms halftone dots is performed, and thereby the concerned pixel having the maximum gradation value for the image data of the original image cannot be formed as a solid image.

The correction data comparator 226 and the gradation correction data generator 227 (see FIG. 6) generates the gradation correction data 231 that can solve the above mentioned undesired gradation value related to the primary correction data 235 (see FIG. 10), in which the correction data comparator 226 and the gradation correction data generator 227 can be collectively used as a gradation correction data generator. Specifically, the correction data comparator 226 compares the output gradation values defined by the primary correction data 235 and the output gradations values defined by secondary correction data 236 for each of the input gradation values existing in a specific range set from a specific gradation value to the maximum gradation value.

Based on a comparison result obtained by the correction data comparator 226, the gradation correction data generator 227 generates the gradation correction data 231. Specifically, for each of the input gradation values, the correction data comparator 226 compares the output gradation values defined by the primary correction data 235 corresponding to the input gradation values and the output gradation values defined by the secondary correction data 236 corresponding to the input gradation values. If the output gradation values defined by the primary correction data 235 is greater than the output gradation values defined by the secondary correction data 236, the primary correction data 235 is used as the gradation correction data for the concerned input gradation values, and if the output gradation values defined by the secondary correction data 236 is greater than the output gradation values defined by the primary correction data 235, the secondary correction data 236 is used as the gradation correction data for the concerned input gradation values. Further, as to the input gradation values smaller than the specific gradation value, the primary correction data 235 is used as the gradation correction data 231 without performing the comparing process.

As above described, the correction data comparator 226 and the gradation correction data generator 227 can be collectively used as the gradation correction data generator, and the gradation correction data 231 can be generated as the gradation correction data by the gradation correction data generator. The gradation correction data generator 227 stores the generated gradation correction data 231 in the memory, and transmits the calibration completed notice indicating that the generation of the gradation correction data is completed to the PC 100, which is a sender apparatus that sends the patch print instruction (see FIG. 5). The gradation correction data 231 can be used as gradation correction data for correcting each one of the original gradation values.

Figure 11:
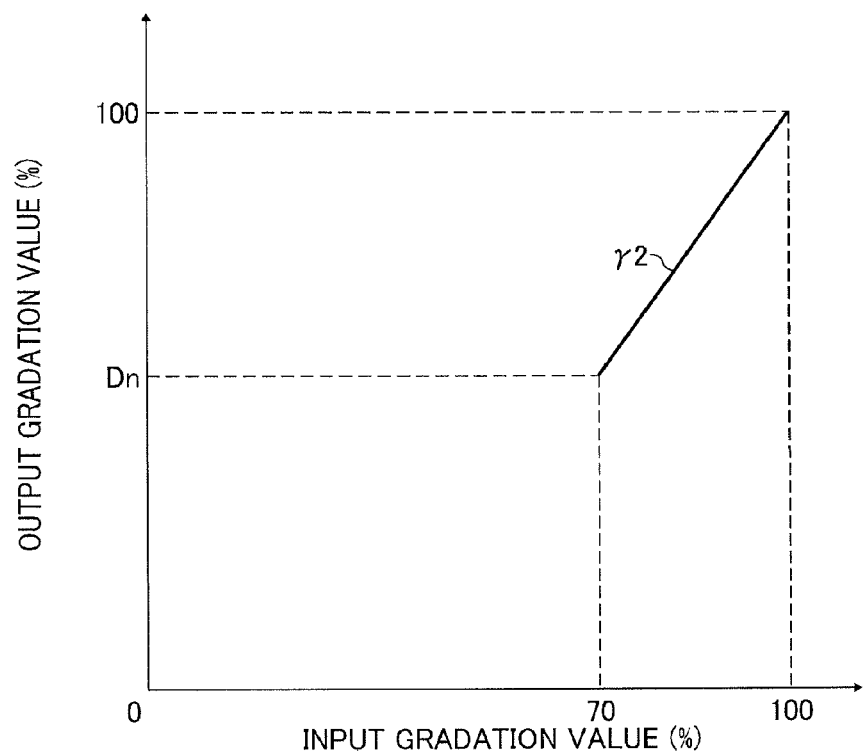
FIG. 11 illustrates an example of secondary correction data.
Figure 12:
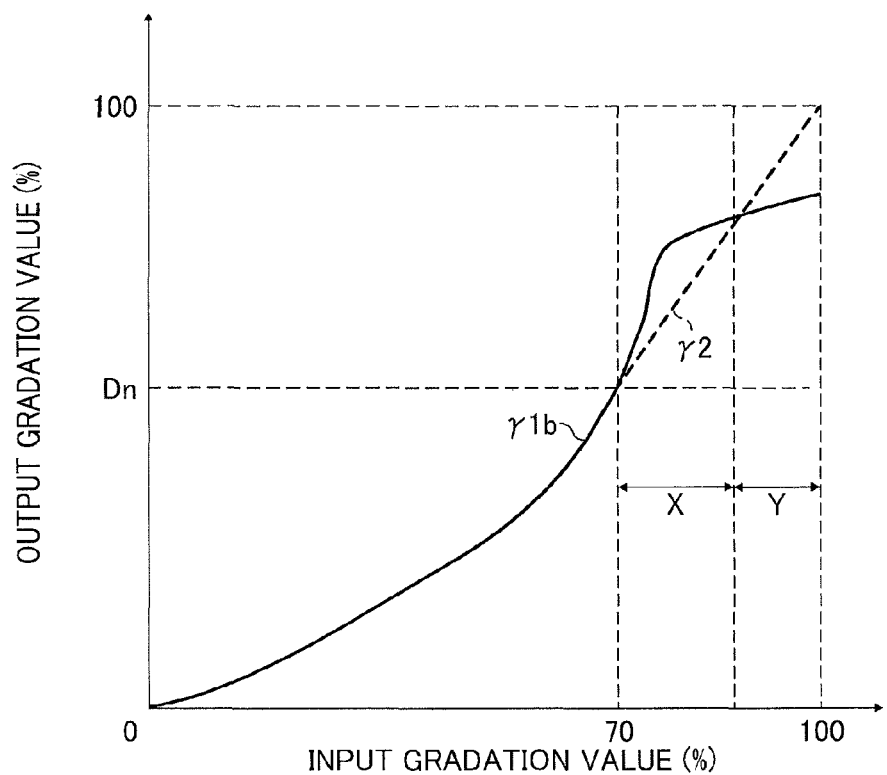
FIG. 12 illustrates a relationship of the primary gradation correction data of FIG. 10 and the secondary correction data of FIG. 11.
Figure 13:
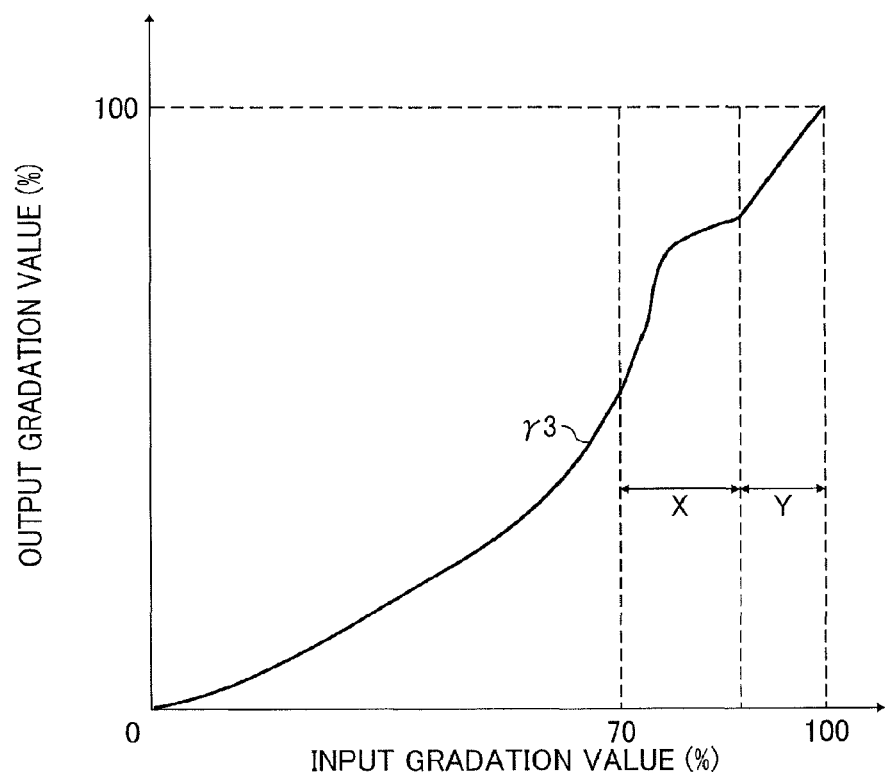
FIG. 13 illustrates an example of gradation correction data generated from the primary gradation correction data and the secondary correction data of FIG. 12.

A description is further given of capabilities of the correction data comparator 226 and the gradation correction data generator 227 with reference to FIGS. 11 to 13. The correction data comparator 226 and the gradation correction data generator 227 generates the gradation correction data 231 by using the primary correction data 235 as much as possible while setting an output gradation value corresponding to the maximum gradation value of the input gradation values as the maximum gradation value of the output gradation values.

FIG. 11 illustrates an example of the secondary correction data 236 used for generating the gradation correction data. The secondary correction data 236 is prepared as data that can be defined by the format similar to the format of the primary correction data 235. The secondary correction data 236 includes supplemental-correction-use data that can retain or maintain the maximum gradation value of the input gradation values as the maximum gradation value of the output gradation value after the gradation values are corrected. For example, the secondary correction data 236 indicated by a profile γ2 (i.e., solid line) of FIG. 11 defines the supplemental-correction-use data to be used for each one of the input gradation values existing in a specific range set from a specific gradation value (e.g., any percentage of the maximum gradation value such as 70%) to the maximum gradation value, in which the output gradation values change linearly.

Further, if the secondary correction data 236 indicated in FIG. 11 is applied to the primary correction data 235 indicated by the profile γ1b of FIG. 10, an output gradation value Dn corresponded to the specific gradation value (e.g., 70%) on the profile γ2 of FIG. 11 becomes the output gradation value corresponded to the specific gradation value (e.g., 70%) for the concerned primary correction data 235 (see FIG. 12). As above described, the secondary correction data 236 can be generated after the primary correction data 235 is generated. Further, the secondary correction data 236 can be generated in advance, and the same secondary correction data 236 can be used for any types of the primary correction data 235.

FIG. 12 illustrates a relationship of the primary correction data 235 of FIG. 10 and the secondary correction data 236 of FIG. 11. As illustrated in FIG. 12, when the output gradation values of the primary correction data 235 (i.e., profile γ1b) and the output gradation value of the secondary correction data 236 (i.e., profile γ2) are compared in the specific range set from the specific gradation value (e.g., 70%) to the maximum gradation value, the output gradation values of the primary correction data 235 (i.e., profile γ1b) are greater than the output gradation value of the secondary correction data 236 (i.e., profile γ2) in a range indicated by an arrow X, and the output gradation value of the secondary correction data 236 (i.e., profile γ2) are greater than the output gradation values of the primary correction data 235 (i.e., profile γ1b) in a range indicated by an arrow Y.

The secondary correction data 236 is generated as data to maintain the maximum gradation value of the input gradation values after the gradation correction is performed for the image data. As to the output gradation values smaller than the maximum gradation value, the output gradation values corresponding to the input gradation values can be changed smoothly by using the secondary correction data 236. Therefore, the image density of the image generated from the secondary correction data 236 may not exactly match the target density 234. Therefore, in the range that the output gradation values of the primary correction data 235 are greater than the output gradation values of the secondary correction data 236, the image having the density closer to the target density 234 can be obtained by using the primary correction data 235 that is corresponded to the target density 234.

Therefore, the gradation correction data generator 227 employs the primary correction data 235 as the gradation correction data 231 in the range indicated by the arrow X, and the gradation correction data generator 227 employs the secondary correction data 236 in the range indicated by the arrow Y to generate the gradation correction data that is smoothly continued to the maximum gradation value. Further, as to the input gradation values existing in the range smaller than the specific gradation value (e.g., 70%), since the input gradation values do not affect the correction of the maximum gradation value, the comparison with the secondary correction data 236 is not required, and thereby the gradation correction data generator 227 can employ the primary correction data 235 as the gradation correction data 231 without comparing with the secondary correction data 236.

FIG. 13 illustrates an example of the gradation correction data 231 generated from the primary gradation correction data and the secondary correction data of FIG. 12, in which the gradation correction data 231 is indicated as a profile γ3 (i.e., solid line). By generating the gradation correction data 231 as above described, a pixel having the maximum gradation value for the image data of the original image can maintain the maximum gradation value after the gradation correction is performed, with which the occurring of halftone dots by performing the halftone process at the pixel having the maximum gradation value can be avoided, with which the deterioration of image quality such as lower density and jaggy at characters and lines in a print product can be prevented. Further, when the secondary correction data 236 is applied to the range having greater gradation values as above described, the gradation correction process may deviate from the desired calibration of the gradation correction. However, by using the primary correction data 235 as much as possible, the desired calibration of the gradation correction can be performed, and thereby the image quality can be stabilized.

Further, when the measured density exceeds the target density 234 at the maximum gradation value as indicated by the profile Bb in FIG. 8, the output gradation values of the primary correction data 235 becomes smaller than the output gradation values of the secondary correction data 236 at the maximum gradation value and near the maximum gradation value as indicated in FIG. 12. Therefore, as to each of the gradation values in the specific range set from the specific gradation value (e.g., 70%) to the maximum gradation value, the output gradation values of the primary correction data 235 and the output gradation values of the secondary correction data 236 are compared. Then, the primary correction data 235 is used as the gradation correction data if the output gradation values of the primary correction data 235 are greater than the output gradation values of the secondary correction data 236, and the secondary correction data 236 is used as the gradation correction data if the output gradation values of the secondary correction data 236 are greater than the output gradation values of the primary correction data 235, with which the primary correction data 235 can be used as the gradation correction data 231 as much as possible, and the gradation correction data 231 that can smoothly connect the output gradation values to the maximum gradation value can be generated by using the secondary correction data 236.

Figure 14:
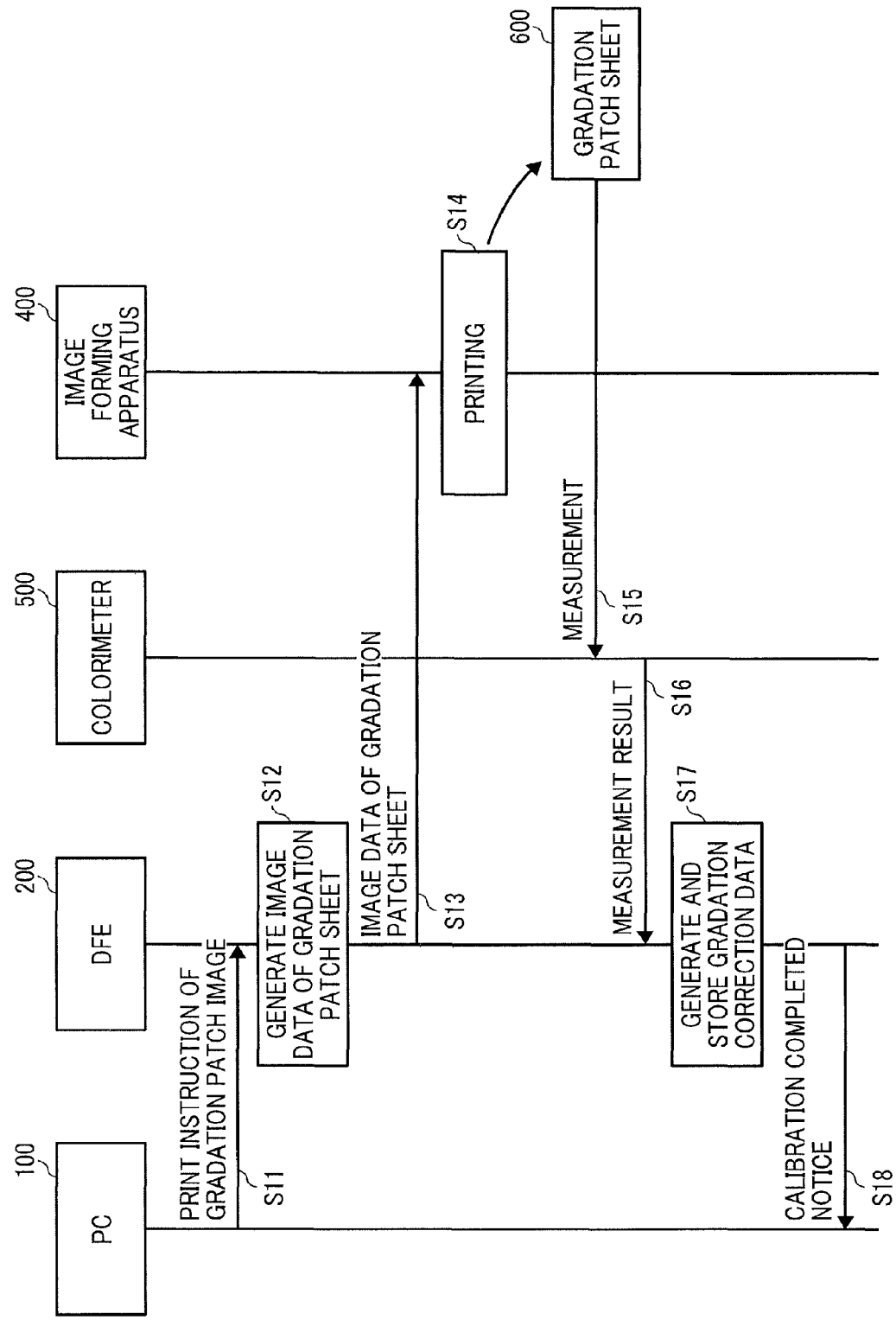
FIG. 14 illustrates an operational sequence for generating gradation correction data.

A description is given of an operational sequence of each of the apparatuses with reference to FIG. 14. FIG. 14 illustrates an operational sequence of each of the apparatuses for generating the gradation correction data 231 using the above described capabilities, in which the MIC 300 is used as the communication interface. The operation of each of the apparatuses is performed by the CPU of each of the apparatuses that executes specific programs. The generation of the gradation correction data 231 can be started when the instruction is input from the PC 100 as a trigger. When the PC 100 detects that the gradation correction data 231 is required to be newly generated and updated based on a user operation or automatically, the PC 100 transmits a print instruction of a gradation patch image to the DFE 200 (S11). After receiving the print instruction, the DFE 200 generates image data to be used for printing a gradation patch sheet by using the image forming apparatus 400 based on the gradation patch data 233 stored in advance (S12), and transmits the generated image data to the image forming apparatus 400 (S13).

After receiving the image data, the image forming apparatus 400 performs the printing based on the received image data (S14) to output the gradation patch sheet 600. Then, the colorimeter 500 measures the color and density on the gradation patch sheet 600 (S15), and transmits the measurement result to the DFE 200 (S16). The measurement can be performed based on a user instruction. The DFE 200 generates and stores the gradation correction data 231 based on the received measurement result using the capabilities described with reference to FIG. 6 in the memory (S17), and transmits the calibration completed notice to the PC 100 (S18).

Figure 15:
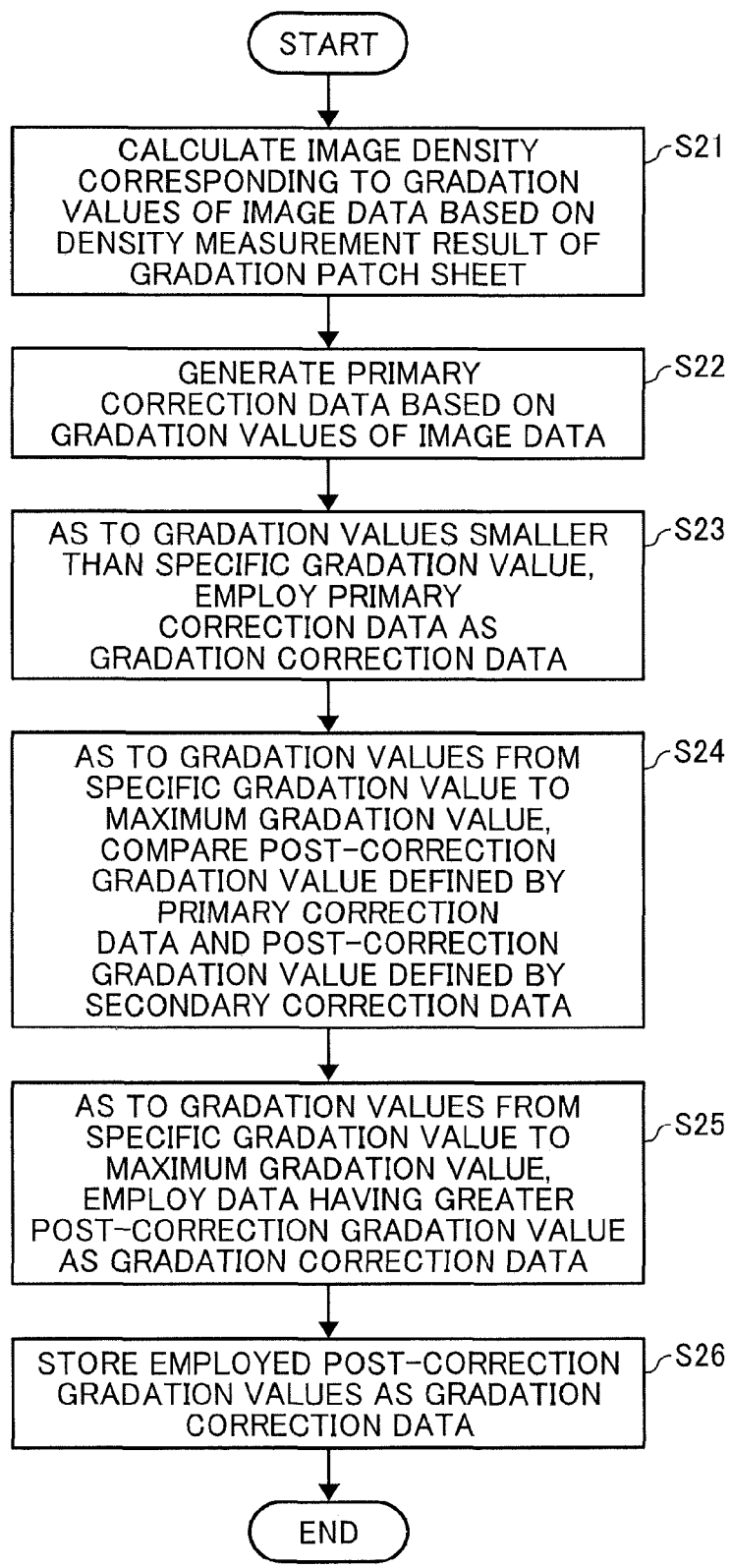
FIG. 15 is a flowchart illustrating the steps of a process of generating correction data of a first example embodiment of FIG. 14.

A description is given of step S17 of FIG. 14 in detail with reference to FIG. 15, which is a flowchart illustrating a process of step S17 of FIG. 14. At first, the DFE 200 calculates image density corresponding to each of gradation values of the image data based on the density measurement result of the gradation patch sheet 600 (S21). Then, the DFE 200 generates the primary correction data 235 that defines correction-use data used for correcting each of the gradation values so that an image having the target density set for the each of gradation values of the image data can be formed by using the image forming apparatus 400 (S22).

Then, the DFE 200 employs the primary correction data 235 generated at step S22 as the gradation correction data 231 for the gradation values that are smaller than the specific gradation value (S23). Then, the DFE 200 compares post-correction gradation values defined by the primary correction data 235 and post-correction gradation values defined by the secondary correction data 236 for the gradation values existing in the specific range set from the specific gradation value to the maximum gradation value of the input gradation values (S24). Based on a comparison result at step S24, the DFE 200 employs data having the greater post-correction gradation values as the gradation correction data 231 for the gradation values existing in the specific range set from the specific gradation value to the maximum gradation value of the input gradation values (S25). Then, the DFE 200 stores the gradation correction data 231 set for each of the gradation values employed at steps S23 and S25 in the memory (S26), and completes the sequence of FIG. 15. With employing the above described sequence, the deterioration of image quality can be prevented, and the gradation correction data 231 that can correct the gradation values without causing the image quality destabilization can be generated and used for the gradation correction process.

Second Example Embodiment

Figure 16:
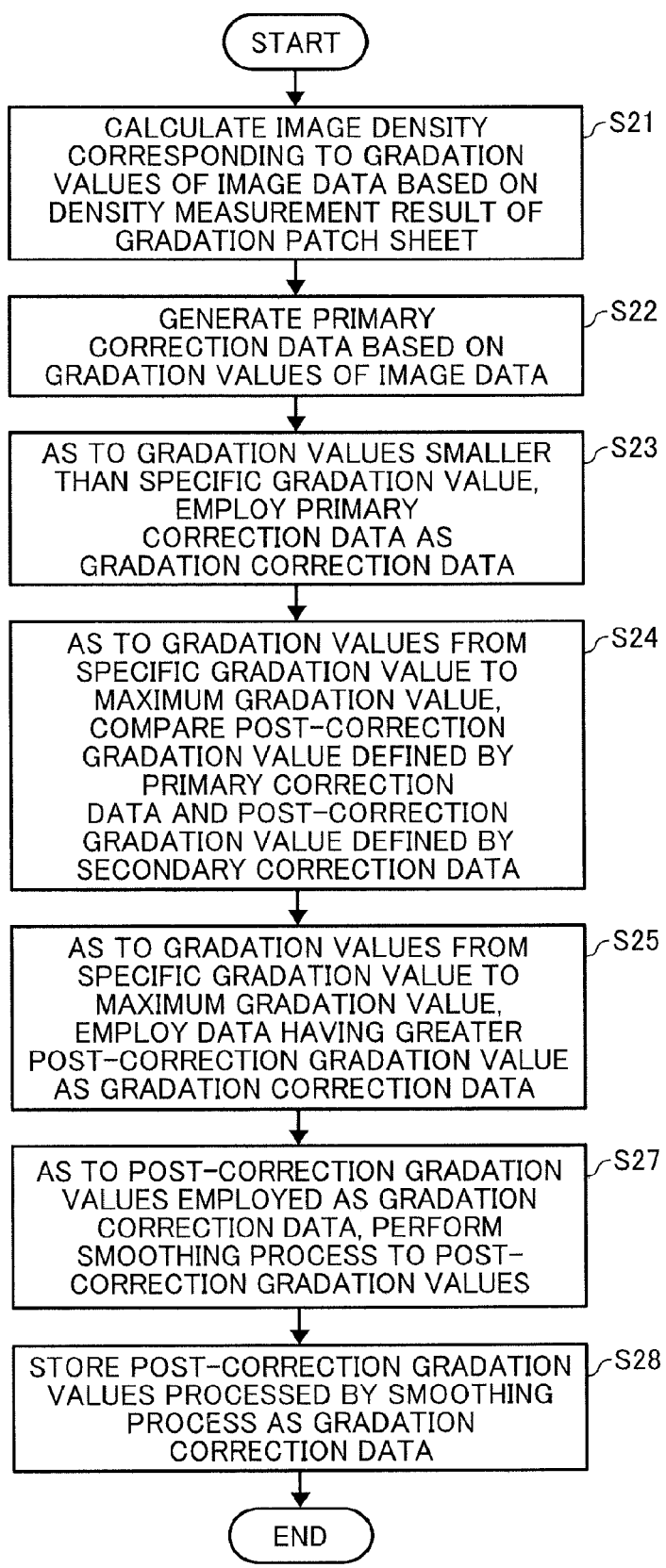
FIG. 16 is a flowchart illustrating the steps of a process of generating correction data of a second example embodiment.
Figure 17:
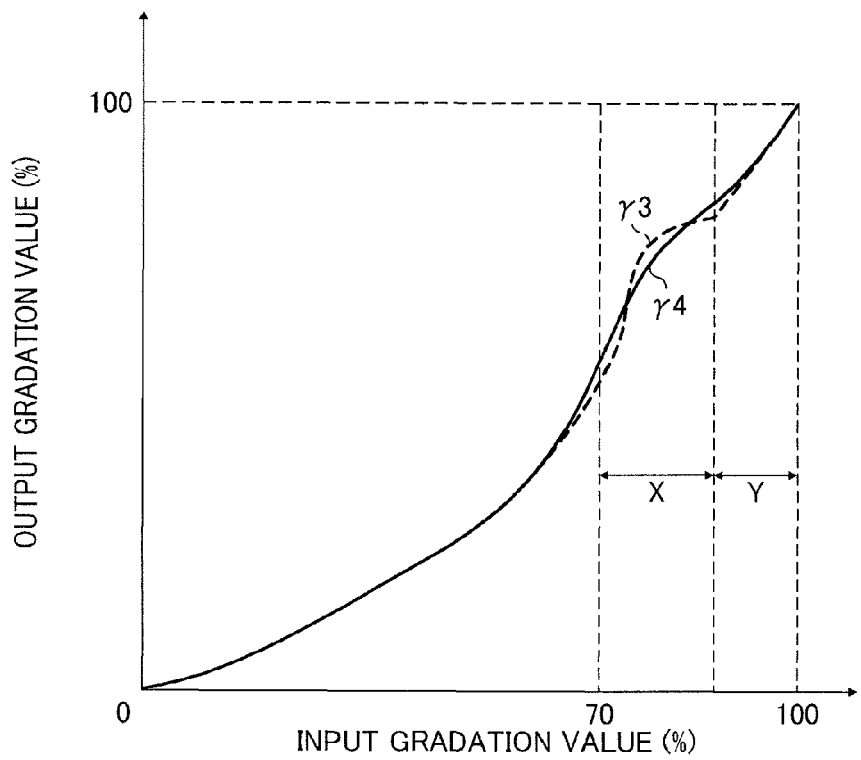
FIG. 17 illustrates an example of a smoothing process.
Figure 18:
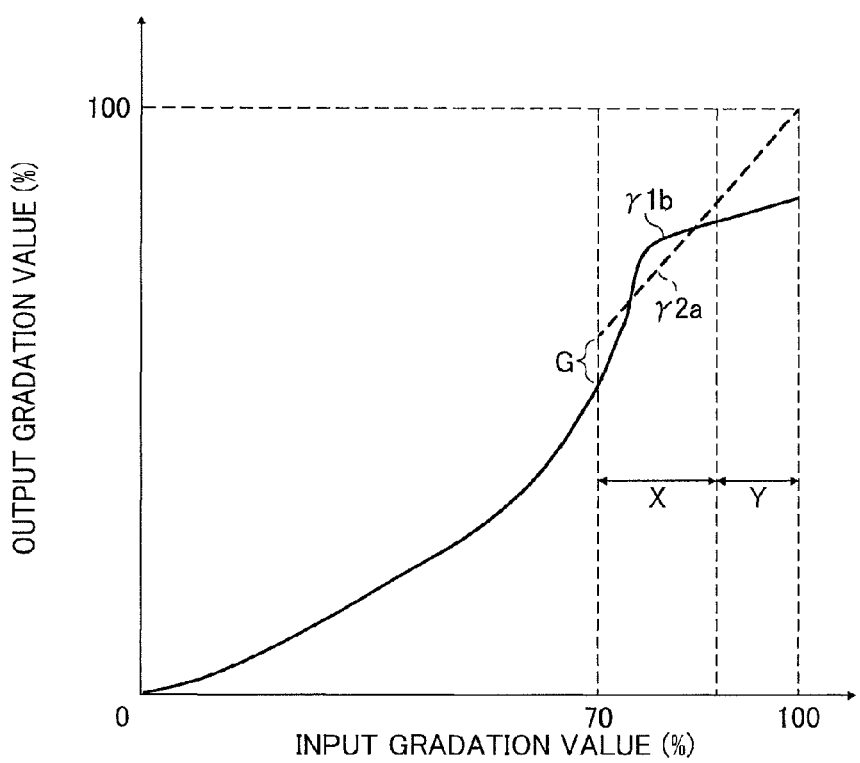
FIG. 18 illustrates an example of a gap of the secondary correction data and the primary gradation correction data.

A description is given of a second example embodiment of the present invention with reference to FIGS. 16 to 18. As to the second example embodiment, the gradation correction data generator 227 performs a smoothing process to the generated gradation correction data 231, which is different from the first example embodiment. Since the second example embodiment is same as the first example embodiment except the smoothing process, a description is given of this difference for the second example embodiment. The corresponding same configurations of the first example embodiment and the second example embodiment use the same references.

FIG. 16 is a flowchart illustrating the steps of a process of generating the correction data of the second example embodiment. The steps 21 to S25 of FIG. 16 is same as the steps 21 to S25 of FIG. 15, and steps 27 and 28 of FIG. 16 are not included in the process of FIG. 15. Specifically, after step S25, the DFE 200 performs the smoothing process to the gradation correction data 231 set for each of the gradation values employed at steps S23 and S25 so that the output gradation values (i.e., post-correction gradation values) corresponding to each of the input gradation values, which are continuous values, can be changed smoothly (S27). After the smoothing process, the DFE 200 stores the output gradation values corresponding to each of the input gradation values as the gradation correction data 231 (S28) in the memory.

FIG. 17 illustrates an example of the smoothing process. In FIG. 17, a profile γ3 (i.e., dot line) indicates the gradation correction data 231 of FIG. 13, and a profile γ4 (i.e., solid line) indicates gradation correction data obtained by performing the smoothing process to the gradation correction data 231 indicated by the profile γ3 of FIG. 13, which means the profile γ4 indicates the gradation correction data 231 used for the gradation correction process for the second example embodiment. As to the above described processing, the primary correction data 235 defines the output gradation values that the printed image density corresponding to each of the input gradation values becomes the target density without considering the change of the output gradation values with respect to change of the input gradation values.

Therefore, as to the gradation correction data indicated by the profile γ3, a change ratio of the output gradation values with respect to the change ratio of the input gradation values may become too great at some input gradation values in the range indicated by the arrow X that employs the primary correction data 235 as the gradation correction data and in the range that the input gradation values are smaller than the specific gradation value. If the change ratio of the output gradation values with respect to the change ratio of the input gradation values becomes too great, the output gradation values may abruptly change from one value to another value having a greater interval between the one value and another value, in which a plurality of continuously existing output gradation values between the one value and another value may not be used as the output gradation values, with which the gradation skipping occurs, and thereby the image quality may deteriorate. By performing the smoothing process, the abrupt change of the output gradation values can be reduced, and the image quality deterioration caused by the abrupt change of the output gradation values can be reduced.

Further, at a boundary of the range indicated by the arrow X and the range indicated by the arrow Y, the values of the gradation correction data 231 changes from a value defined by the primary correction data 235 to a value defined by the secondary correction data 236, in which the change ratio of the output gradation values with respect to the change ratio of the input gradation values may abruptly change. If an image is formed by using the image forming apparatus 400 based on the image data that is corrected by using the gradation correction data 231 having the abrupt change of the output gradation values, the printed image may have uneven density. By performing the smoothing process, the abrupt change of the output gradation values can be reduced, and the image quality deterioration caused by the abrupt change of the output gradation values can be reduced.

By performing the smoothing process to the gradation correction table, the gradation skipping can be reduced, and the density of the printed image can be stabilized, and thereby a print product having little visual awkwardness can be obtained. The smoothing process can be performed by using moving average method, a function filter such as Gaussian filter, and any formulas. Further, the smoothing process is not required for the entire range of the input gradation values. Typically, the abrupt change of the output gradation values may not occur at the relatively smaller gradation values, and thereby the smoothing process can be started from the input gradation values smaller than the specific gradation value and near the specific gradation value where the comparison of the primary correction data 235 and the secondary correction data 236 is started.

Further, if the secondary correction data 236 is generated in advance as indicated by a profile γ2a (i.e., dot line) in FIG. 18, the output gradation value of the primary correction data 235 (i.e., profile γ1b) and the output gradation value of the secondary correction data 236 (i.e., profile γ2a) may not exactly match at the specific gradation value (e.g., 70%) of the input gradation values as indicated by a gap G in FIG. 18. If the greater output gradation values are employed for the input gradation values existing in the specific gradation value or more when the output gradation value of the primary correction data 235 and the output gradation value of the secondary correction data 236 does not match exactly at the specific gradation value (e.g., 70%) of the input gradation values, the abrupt change of the output gradation value occurs at the specific gradation value of the input gradation value as indicated the gap G. By performing the smoothing process, the abrupt change of the output gradation values can be reduced, and the image quality deterioration caused by the abrupt change of the output gradation values can be reduced.

Third Example Embodiment

Figure 19:
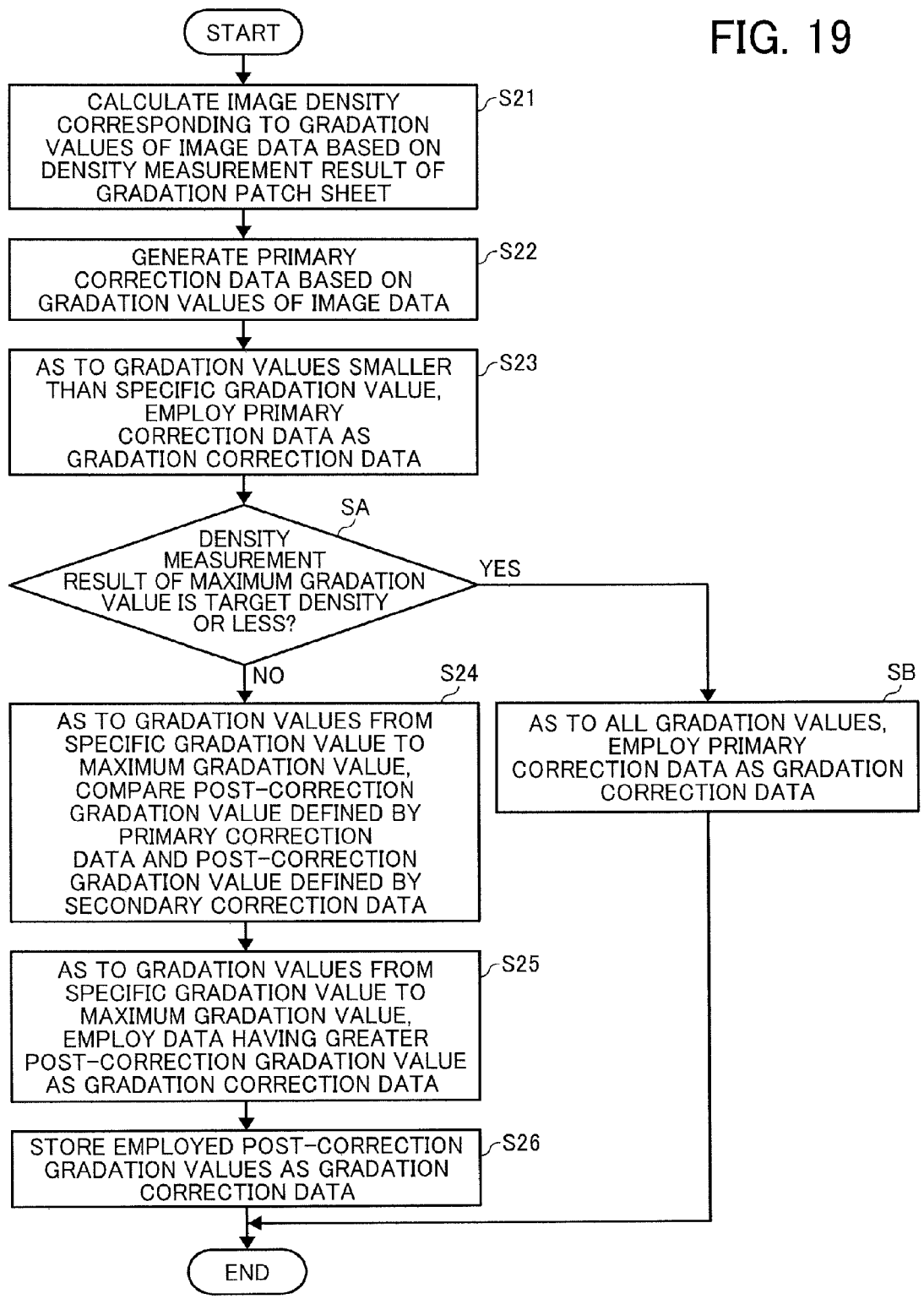
FIG. 19 is a flowchart illustrating the steps of a process of generating correction data of a third example embodiment.

A description is given of a third example embodiment of the present invention with reference to FIG. 19. As to the third example embodiment, when the density measurement result for the maximum gradation value is the target density 234 or less, the primary correction data 235 is employed as the gradation correction data 231 for all of the gradation values, which is different from the first example embodiment. Since the third example embodiment is same as the first example embodiment except the employment of the primary correction data 235 as the gradation correction data 231 for all of the gradation values, a description is given of this difference for the third example embodiment.

FIG. 19 is a flowchart illustrating the steps of a process of generating the correction data of the third example embodiment. The steps 21 to S26 of FIG. 19 are same as the steps 21 to S26 of FIG. 15, and steps SA and SB of FIG. 19 are not included in the process of FIG. 15. Specifically, after step S23, the DFE 200 determines whether the density measurement result of the maximum gradation value of the image data is the target density 234 or less for the maximum gradation value (SA). If step SA is YES (i.e., the density measurement result becomes the target density 234 or less), the maximum gradation value of the input gradation values corresponds to the maximum gradation value of the output gradation values in the primary correction data 235. Therefore, the adjustment of the primary correction data 235 by using the secondary correction data 236 is not required. Therefore, the DFE 200 employs the primary correction data 235 alone for all of the gradation values as the gradation correction data 231, and stores the primary correction data 235 (SB) in the memory, and completes the sequence of FIG. 19.

The step SA becomes Yes when the density measurement result acquired by the density acquisition unit 224 becomes, for example, the profile Bc of FIG. 8. In this case, the image density formed by the image forming apparatus 400 based on the maximum gradation value does not reach the target density, in which the correction process that decreases the gradation values is not performed to the maximum gradation value. In this case, the comparison of the primary correction data 235 and the secondary correction data 236 can be omitted, with which the gradation correction data 231 can be generated with a faster processing speed and a lower processing load.

Fourth Example Embodiment

Figure 20:
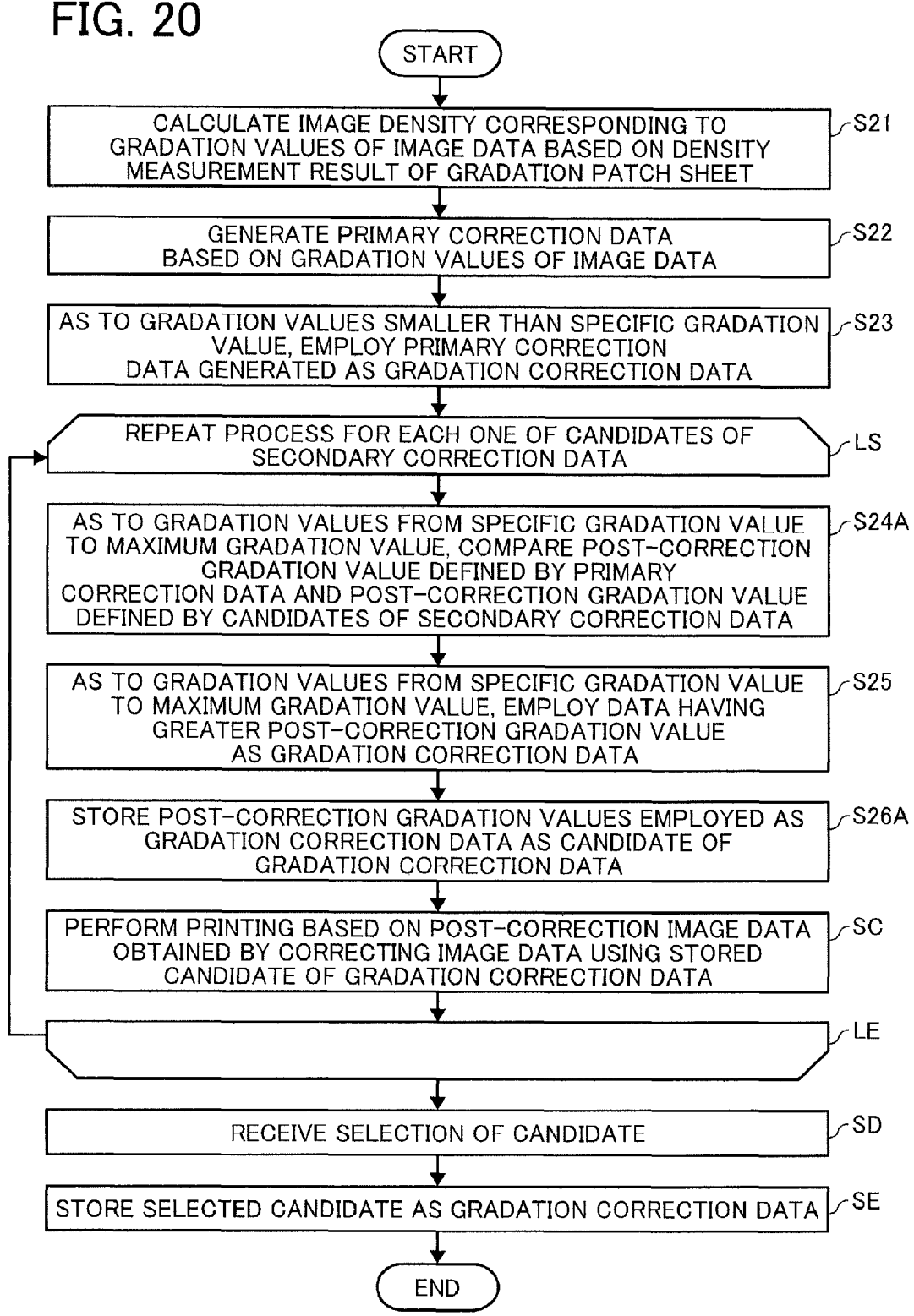
FIG. 20 is a flowchart illustrating the steps of a process of generating correction data of a fourth example embodiment.
Figure 21:
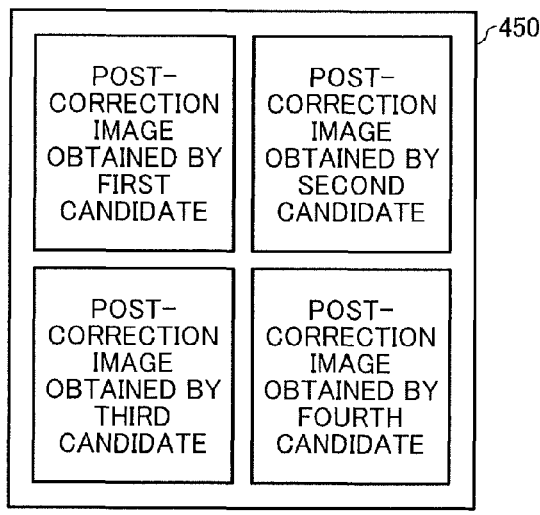
FIG. 21 illustrates examples of printed samples.

A description is given of a fourth example embodiment with reference to FIGS. 20 and 21. As to the fourth example embodiment, a user can select the secondary correction data 236 to be used for generating the gradation correction data 231 from a plurality of candidates, which is different from the first example embodiment. Since the fourth example embodiment is same as the first example embodiment except the selection of candidates, a description is given of this difference for the fourth example embodiment.

FIG. 20 is a flowchart illustrating the steps of a process of generating the correction data of the fourth example embodiment. The steps 21 to S23 of FIG. 20 are same as the steps 21 to S23 of FIG. 15. Then, steps S24A to SC of FIG. 20 are performed for each one of candidates of the secondary correction data 236 one by one by using the DFE 200, in which each one of candidates of the secondary correction data 236 is processed as a process target. The step S24A is performed for each one of the candidates of the secondary correction data 236, which is different from step S24 of FIG. 15 using the secondary correction data 236 as the process target. The step S25 of FIG. 19 is same as the step S25 FIG. 15. The step S26A that stores each of the employed values as candidates of the gradation correction data 231 is different from step S26 of FIG. 15.

In the process of FIG. 20, after step S26A, the DFE 200 performs the gradation correction for a sample image data, which can be generated in advance or designated by a user, using the candidate of the gradation correction data 231 stored in step S26A, and instructs the image forming apparatus 400 to perform the printing based on the image data having received the gradation correction process using the candidate of the gradation correction data 231 (SC), in which the halftone process is also performed similar to the normal printing operation.

Therefore, when the processes until step SC is completed for all of the of candidates of the secondary correction data 236, the image forming apparatus 400 can output a plurality of images corrected by using a plurality of the gradation correction data 231 generated by using a plurality of candidates of the secondary correction data 236 as sample images. The printing of sample images can be performed on different sheets or can be performed on the same one sheet 210 as illustrated in FIG. 21, in which four samples images are printed on the sheet 210.

Then, the DFE 200 receives a selection instruction of candidates of the gradation correction data stored at step S26A from a user (SD), in which the user can select the candidate that can obtain a desired printed product by checking the printed sample images visually. When the DFE 200 receives the selection of candidate, the DFE 200 stores the gradation correction data generated by using the selected candidate as the gradation correction data 231 to be used for the subsequent gradation correction process (SE) in the memory, and completes the sequence of FIG. 20.

The operation sequence of the fourth example embodiment can attain the effect of the first example embodiment, and can perform the gradation correction that can produce a print product having the desired image quality for a user. Since the secondary correction data 236 is generated without considering the target density, and then used for the gradation correction process, the print product may not have the image quality desired for the user. If the to-be-used secondary correction data 236 can be selected from a plurality of candidates, the risk of producing the undesired print product for the user can be reduced. Further, if the user can select the secondary correction data 236 from the plurality of candidates by checking the printed sample images corresponding to each of the plurality of candidates, the risk of producing the undesired print product for the user can be further reduced.

The selection at step SD may mean the selection of candidates of the secondary correction data 236 to be used for generating the gradation correction data 231. Further, when the gradation correction data 231 is generated for a plurality of conditions, the candidates of the secondary correction data 236 selected for one condition can be used for generating the gradation correction data 231 for other conditions. Further, when one candidate of the secondary correction data 236 is selected at once, the selected one candidate can be set as the default data for the secondary correction data 236, in which the DFE 200 automatically applies the one candidate until the user re-select other candidate, in which the process of FIG. 20 is not required until the user re-selects the candidate, and the gradation correction data 231 can be generated by performing the process of FIG. 15.

Variant Example

Figure 22:
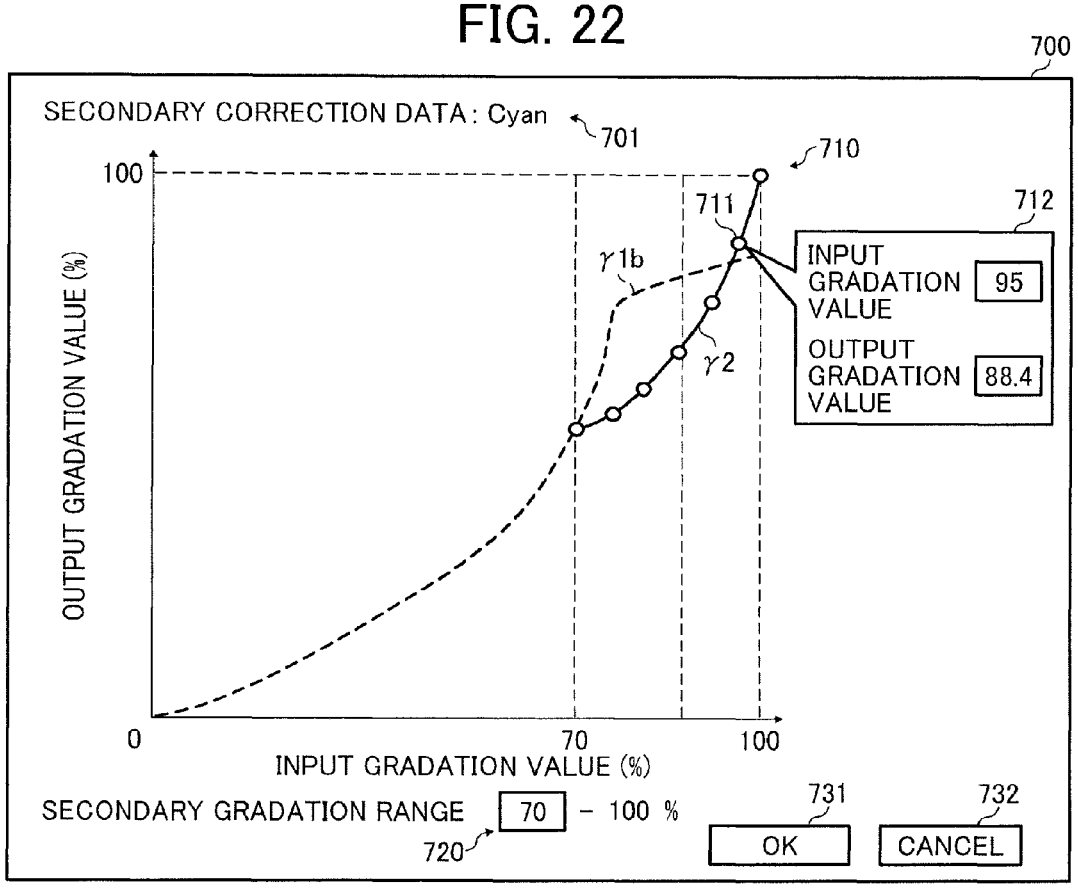
FIG. 22 illustrates an example of a secondary correction data edition screen.

The configuration of the apparatus, the process sequence, the configuration of to be used data are not limited to the above described configuration. For example, a configuration that the secondary correction data 236 is edited by a user via the PC 100 or the DFE 200 can be devised. FIG. 22 illustrates an example of an edition screen such as a secondary correction data edition screen 700.

The secondary correction data edition screen 700 can be used as a screen to receive an edition instruction of the secondary correction data 236 after generating the primary correction data 235. As illustrated in FIG. 22, the secondary correction data edition screen 700 includes, for example, a data name section 701, a profile section 710, an edition point 711, a coordinate section 712, a specific gradation value input section 720, an OK button 731 and a cancel button 732. The data name section 701 displays a usage of the secondary correction data 236 such as an edition target. In an example case of FIG. 22, the data name section 701 displays that the secondary correction data 236 used for generating the gradation correction data 231 of cyan color, which is the edition target.

The profile section 710 displays a profile of the generated primary correction data 235 and a profile of the secondary correction data 236 being edited as similar to the profile of FIG. 12. In an example case of FIG. 22, the generated primary correction data 235 is indicated by the profile γ1b and the generated secondary correction data 236 being edited is indicated by the profile γ2. The edition point 711 indicates a point that a user designates on the profile γ2. When one of the edition points 711 is selected, the coordinate section 712 is displayed, and then the user can designate coordinates of a position of the selected edition point 711. When the coordinates are designated, the selected edition point 711 is moved to the designated coordinates, and the profile of the secondary correction data 236 can be changed to a smooth profile that passes points smoothly connecting each of the edition points 711. Further, the output gradation values of the secondary correction data 236 may or may not monotonically increase with respect to the input gradation values.

The specific gradation value input section 720 indicates the lower limit of the range set for the secondary correction data 236. The specific gradation value input section 720 receives the designation of the above described specific gradation value. The specific gradation value input section 720 indicates that the upper limit of the range is a fixed value of 100%. The OK button 731 is used to close the secondary correction data edition screen 700 after applying the edition result of the secondary correction data edition screen 700, and the cancel button 732 is used to close the secondary correction data edition screen 700 without applying the edition result of the secondary correction data edition screen 700.

When the secondary correction data edition screen 700 is closed, the generation of the gradation correction data 231 is started by using the secondary correction data 236 set at the time point when the secondary correction data edition screen 700 is closed or a default value when the cancel button 732 is operated. Further, the edition of the secondary correction data 236 can be performed separately from the generation of the gradation correction data 231, in which the secondary correction data 236 to be used for the generation of the gradation correction data 231 is edited later. Further, the secondary correction data 236 can be registered by editing a plurality of candidates. As above described, if a user can edit the secondary correction data 236, the gradation correction data 231 that is desired for the user can be generated.

As to the above described example embodiments, the gradation correction data 231 to be used for correcting the gradation values existing in the specific range set from the specific gradation value to the maximum gradation value can generated by using the primary correction data 235 and the secondary correction data 236, in which by comparing the post-correction gradation values of the primary correction data 235 and the post-correction gradation values of the secondary correction data 236, the correction data having the greater post-correction gradation values is employed as the gradation correction data 231, but not limited hereto. For example, a user can select which of the primary correction data 235 and the secondary correction data 236 is employed for each of the gradation values by using the secondary correction data edition screen 700, with which a user's intension can be applied as required.

Further, for example, except the maximum gradation value, the primary correction data 235 or the secondary correction data 236 having the smaller post-correction gradation value can be employed as the gradation correction data 231, with which consumption amount of developer used for the printing operation can be reduced, and the generation of halftone dots can be prevented at least for the maximum gradation value, and thereby the image quality can be maintained. Further, for example, except the maximum gradation value, the primary correction data 235 can be employed as the gradation correction data 231, with which the gradation correction can be performed by applying the target density as much as possible, and the printing matched to a user need can be performed, in which the generation of halftone dots can be prevented at least for the maximum gradation value, and thereby the image quality can be maintained.

Further, as to the above described example embodiments, the image forming apparatus 400 is disposed for only one in the system, but not limited hereto. For example, a plurality of the image forming apparatuses 400 can be disposed and selectively used in the system, in which the gradation correction data 231 can be separately generated for each one of the image forming apparatuses 400 to be used for the printing operation. In this case, the gradation patch sheet used for generating the gradation correction data 231 is printed by using a specific image forming apparatus that is to perform the printing operation by applying the corresponding gradation correction data 231.

Further, as to the above described example embodiment, the capabilities of the PC 100 and/or the DFE 200 can be dispersed to a plurality of apparatuses, in which the capabilities of the PC 100 and/or the DFE 200 can be devised by collectively using the plurality of apparatuses. For example, various data such as the gradation correction data 231 and the halftone data 232 can be stored in an external apparatus of the DFE 200. The dispersed destination apparatus can be the MIC 300, the image forming apparatus 400 or the colorimeter 500. By contrast, the capabilities dispersed to a plurality of apparatuses can be integrated into one apparatus. For example, a part of the capabilities of the PC 100 can be devised in the DFE 200, and a part of the capabilities of the DFE 200 can be devised in the PC 100.

As to the above described example embodiments, the original gradation values of the image data input to the image forming apparatus can be corrected by applying the correction data that can correct the original gradation values to another gradation values that can form an image having a target property, and another gradation values can be used to form a desired image quality for the maximum gradation value of the input image data.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions. Further, the above described image processing method performable in the image processing apparatus can be described as a computer-executable program, and the computer-executable program can be stored in a ROM or the like in the image processing apparatus and executed by the image processing apparatus.

It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. An image forming control apparatus for controlling an image forming apparatus to form an image on a recording medium, the image forming control apparatus comprising:
   a memory to store a target property data set for each of original gradation values of image data of a target image to be formed on the recording medium; and
   circuitry to
      acquire actual property data of the target image actually formed on the recording medium, the actual property data being measured by using a measurement apparatus;
      convert the original gradation values of the image data of the target image to other gradation values by referring to a relationship of the target property data stored in the memory and the measured actual property data of the target image;
      generate primary correction data based on the relationship of the original gradation values and the other gradation values converted from the original gradation values;
      generate secondary correction data to supplement the generated primary correction data while maintaining a maximum gradation value of the image data of the target image when correcting the original gradation values of the image data of the target image;
      compare the generated primary correction data and the generated secondary correction data at each one of the original gradation values existing in a specific range set from a specific gradation value to the maximum gradation value of the original gradation values of the image data of the target image; and
      generate gradation correction data used for correcting each one of the original gradation values existing in the specific range based on a comparison result of the generated primary correction data and the generated secondary correction data,
   wherein the primary correction data includes post-correction gradation values corresponding to the original gradation values of the image data of the target image, and the secondary correction data includes post-correction gradation values corresponding to the original gradation values of the image data of the target image,
   wherein the circuitry compares the post-correction gradation values defined by the primary correction data and the post-correction gradation values defined by the secondary correction data for each one of the original gradation values existing in the specific range,
   wherein, when the post-correction gradation values defined by the primary correction data are greater than the post-correction gradation values defined by the secondary correction data, the circuitry employs the primary correction data as the gradation correction data to correct each one of the original gradation values existing in the specific range, and
   wherein, when the post-correction gradation values defined by the secondary correction data are greater than the post-correction gradation values defined by the primary correction data, the circuitry employs the secondary correction data as the gradation correction data to correct each one of the original gradation values existing in the specific range.

2. The image forming control apparatus of claim 1, wherein when a plurality of candidates is set as the secondary correction data, the circuitry selects one of the candidates as the secondary correction data to be used for generating the gradation correction data in response to receiving a selection instruction of the secondary correction data.

3. The image forming control apparatus of claim 2, wherein the circuitry
   compares the primary correction data and each one of the candidates of the secondary correction data after the circuitry generates the primary correction data,
   generates the gradation correction data corresponding to each one of the candidates of the secondary correction data based on a comparison result of the generated primary correction data and each of the candidates of the secondary correction data,
   corrects the image data by using the gradation correction data generated from the comparison result of the generated primary correction data and each of candidates of the secondary correction data, and
   instructs the image forming apparatus to form an image based on the corrected image data.

4. The image forming control apparatus of claim 1, wherein circuitry edits the secondary correction data in response to receiving an edition instruction of the secondary correction data.

5. The image forming control apparatus of claim 1,
   wherein the target property data is a target density of the target image, and the actual property data is a density of the target image formed on the recording medium that is measured by using the measurement apparatus,
   wherein when the measured density of the target image corresponding to the maximum gradation value of the image data of the target image is the target density or less, the circuitry employs the primary correction data as the gradation correction data to correct the image data.

6. The image forming control apparatus of claim 1,
   wherein the generated gradation correction data includes post-correction gradation values corresponding to the original gradation values of the image data of the target image, and
   wherein the circuitry performs a smoothing process to the generated gradation correction data so that the post-correction gradation values change smoothly with respect to the original gradation values of the image data of the target image.

7. An image forming system comprising:
   the image forming control apparatus of claim 1; and
   an image forming apparatus controllable by the image forming control apparatus.

8. A method of generating correction data used for correcting image data of a target image, the corrected image data being used by an image forming apparatus to form an image on a recording medium, the method comprising:
   storing, in a memory, a target property data set for each of original gradation values of image data of a target image to be formed on the recording medium;
   acquiring the target property data from the memory and actual property data of the target image actually formed on the recording medium by using the image forming apparatus and measured by using a measurement apparatus;
   converting the original gradation values of the image data of the target image to other gradation values by referring to a relationship of the target property data and the measured actual property data of the target image;

generating primary correction data based on the relationship of the original gradation values and the other gradation values converted from the original gradation values;

generating secondary correction data to supplement the generated primary correction data while maintaining a maximum gradation value of the image data of the target image when correcting the original gradation values of the image data of the target image;

comparing the generated primary correction data and the generated secondary correction data at each one of the original gradation values existing in a specific range set from a specific gradation value to the maximum gradation value of the original gradation values of the image data of the target image; and generating gradation correction data used for correcting each one of the original gradation values existing in the specific range based on a comparison result of the generated primary correction data and the generated secondary correction data, wherein the primary correction data includes post-correction gradation values corresponding to the original gradation values of the image data of the target image, and the secondary correction data includes post-correction gradation values corresponding to the original gradation values of the image data of the target image, wherein the method further includes comparing the post-correction gradation values defined by the primary correction data and the post-correction gradation values defined by the secondary correction data for each one of the original gradation values existing in the specific range, wherein, when the post-correction gradation values defined by the primary correction data are greater than the post-correction gradation values defined by the secondary correction data, the method includes employing the primary correction data as the gradation correction data to correct each one of the original gradation values existing in the specific range, and wherein, when the post-correction gradation values defined by the secondary correction data are greater than the post-correction gradation values defined by the primary correction data, the method includes employing the secondary correction data as the gradation correction data to correct each one of the original gradation values existing in the specific range.

9. A non-transitory storage medium storing a program that, when executed by a computer, causes the computer to execute a method of generating correction data used for correcting image data of a target image, the corrected image data is to be used by an image forming apparatus to form an image on a recording medium, the method comprising:

storing, in a memory, a target property data set for each of original gradation values of image data of a target image to be formed on the recording medium;

acquiring the target property data from the memory and actual property data of the target image actually formed on the recording medium by using the image forming apparatus and measured by using a measurement apparatus;

converting the original gradation values of the image data of the target image to other gradation values by referring to a relationship of the target property data and the measured actual property data of the target image;

generating primary correction data based on the relationship of the original gradation values and the other gradation values converted from the original gradation values;

generating secondary correction data to supplement the generated primary correction data while maintaining a maximum gradation value of the image data of the target image when correcting the original gradation values of the image data of the target image;

comparing the generated primary correction data and the generated secondary correction data at each one of the original gradation values existing in a specific range set from a specific gradation value to the maximum gradation value of the original gradation values of the image data of the target image; and generating gradation correction data used for correcting each one of the original gradation values existing in the specific range based on a comparison result of the generated primary correction data and the generated secondary correction data, wherein the primary correction data includes post-correction gradation values corresponding to the original gradation values of the image data of the target image, and the secondary correction data includes post-correction gradation values corresponding to the original gradation values of the image data of the target image, wherein the method further includes comparing the post-correction gradation values defined by the primary correction data and the post-correction gradation values defined by the secondary correction data for each one of the original gradation values existing in the specific range, wherein, when the post-correction gradation values defined by the primary correction data are greater than the post-correction gradation values defined by the secondary correction data, the method includes employing the primary correction data as the gradation correction data to correct each one of the original gradation values existing in the specific range, and wherein, when the post-correction gradation values defined by the secondary correction data are greater than the post-correction gradation values defined by the primary correction data, the method includes employing the secondary correction data as the gradation correction data to correct each one of the original gradation values existing in the specific range.

* * * * *